US012466645B2

(12) United States Patent
Kitamura et al.

(10) Patent No.: US 12,466,645 B2
(45) Date of Patent: Nov. 11, 2025

(54) TRAVELING VEHICLE SYSTEM AND TRAVELING VEHICLE CONTROL METHOD

(71) Applicant: Murata Machinery, Ltd., Kyoto (JP)

(72) Inventors: Wataru Kitamura, Inuyama (JP); Eijiro Aoki, Inuyama (JP); Toshikazu Nakagawa, Inuyama (JP)

(73) Assignee: Murata Machinery, Ltd., Kyoto (JP)

(*) Notice: Subject to any disclaimer, the term of this patent is extended or adjusted under 35 U.S.C. 154(b) by 855 days.

(21) Appl. No.: 17/612,762

(22) PCT Filed: Apr. 13, 2020

(86) PCT No.: PCT/JP2020/016302
§ 371 (c)(1),
(2) Date: Nov. 19, 2021

(87) PCT Pub. No.: WO2020/235255
PCT Pub. Date: Nov. 26, 2020

(65) Prior Publication Data
US 2022/0315330 A1   Oct. 6, 2022

(30) Foreign Application Priority Data
May 22, 2019   (JP) ................. 2019-095829

(51) Int. Cl.
B65G 1/04   (2006.01)
G05D 1/00   (2024.01)

(52) U.S. Cl.
CPC ......... B65G 1/0464 (2013.01); G05D 1/0287 (2013.01)

(58) Field of Classification Search
CPC .... B65G 1/0464; B65G 1/1373; B61B 13/00; B61B 3/02; G05D 1/0297; G05D 1/0287; G05D 1/69
See application file for complete search history.

(56) References Cited

U.S. PATENT DOCUMENTS

2019/0189488 A1   6/2019   Ito
2021/0149382 A1*  5/2021   Stadie ............... G05B 19/4189

FOREIGN PATENT DOCUMENTS

JP   S63-163608 A   7/1988
JP   H11-143538 A   5/1999
(Continued)

OTHER PUBLICATIONS

KR20200106934 description EN translation with paragraph numbers (Year: 2020).*

Primary Examiner — Jacob S. Scott
Assistant Examiner — Erin Morris
(74) Attorney, Agent, or Firm — DLA Piper LLP (US)

(57) ABSTRACT

A traveling vehicle system includes: a plurality of traveling vehicles; and a controller that is capable of communicating with the plurality of traveling vehicles and that controls the plurality of traveling vehicles, a traveling region of the traveling vehicles having designated therein a plurality of blocking sections each of which undergoes, when occupied by one of the plurality of traveling vehicles, exclusive control to prohibit another traveling vehicle from moving thereinto. The controller determines, where in a series of operations to be executed by the traveling vehicle, the operation of the traveling vehicle from the start of traveling to stopping before executing a predetermined operation included in the series of operations is demarcated, whether or not to grant the traveling vehicle an occupation permission for the blocking sections to be occupied for the traveling vehicle to execute operations.

10 Claims, 21 Drawing Sheets

(56) References Cited

FOREIGN PATENT DOCUMENTS

| | | | | |
|---|---|---|---|---|
| JP | 2004-281622 A | | 10/2004 | |
| KR | 20200106934 A | * | 9/2020 | ........... B65G 1/0464 |
| NO | 20220738 A1 | * | 1/2024 | ........... B65G 1/0464 |
| WO | WO-2015185628 A2 | * | 12/2015 | .............. B60L 58/12 |
| WO | WO-2017186825 A1 | * | 11/2017 | .............. B25J 9/163 |
| WO | 2018/037762 A1 | | 3/2018 | |
| WO | 2018/110178 A1 | | 6/2018 | |
| WO | WO-2019068778 A1 | * | 4/2019 | ............... B65G 1/04 |
| WO | WO-2022102265 A1 | * | 5/2022 | ............. B61B 13/00 |

* cited by examiner

FIG. 7

```
                                       RQ1 (RQA)
    ┌─────────────────────────────────────────────────┐
    │  TRAVELING VEHICLE INFORMATION   D1 : V         │
    │  REQUESTED SECTION               D2 : B42-B48   │
    │  REQUEST TYPE                    D3 : OCCUPATION│
    │  OPERATION                       D4 : TRAVELING │
    │  TIME                            D5 : ○○        │
    └─────────────────────────────────────────────────┘
```

FIG. 8(A)

```
                                    RQ2(RQA)
TRAVELING VEHICLE INFORMATION    D1  :V
REQUESTED SECTION                D2  :B49
REQUEST TYPE                     D3  :OCCUPATION
OPERATION                        D4  :TRANSFER
TIME                             D5  :○○
```

FIG. 8(B)

```
                                    RQ2(RQA)
TRAVELING VEHICLE INFORMATION    D1  :V
REQUESTED SECTION                D2  :B49,B50
REQUEST TYPE                     D3  :OCCUPATION
OPERATION                        D4  :TRANSFER
TIME                             D5  :○○
```

FIG. 8(C)

```
                                    RQ2(RQA)
TRAVELING VEHICLE INFORMATION    D1  :V
REQUESTED SECTION                D2  :B49,B50,B59,B60
REQUEST TYPE                     D3  :OCCUPATION
OPERATION                        D4  :TRANSFER
TIME                             D5  :○○
```

FIG. 10

RQ3 (RQA)

```
TRAVELING VEHICLE INFORMATION   D1 : V
REQUESTED SECTION               D2 : B42-B49
REQUEST TYPE                    D3 : OCCUPATION
OPERATION                       D4 : TRAVELING, DIRECTION CHANGE
TIME                            D5 : ○○
```

RQ4 (RQA)

```
TRAVELING VEHICLE INFORMATION   D1 : V
REQUESTED SECTION               D2 : B39-B29
REQUEST TYPE                    D3 : OCCUPATION
OPERATION                       D4 : TRAVELING
TIME                            D5 : ○○
```

RQ5 (RQA)

```
TRAVELING VEHICLE INFORMATION   D1 : V
REQUESTED SECTION               D2 : B19
REQUEST TYPE                    D3 : OCCUPATION
OPERATION                       D4 : TRANSFER
TIME                            D5 : ○○
```

FIG. 12

```
                                    RQ6(RQA)

TRAVELING VEHICLE INFORMATION    D1 :V
REQUESTED SECTION                D2 :B42-B49
REQUEST TYPE                     D3 :OCCUPATION
OPERATION                        D4 :TRAVELING, CHARGING
TIME                             D5 :○○
```

```
                                    RQ7(RQA)

TRAVELING VEHICLE INFORMATION    D1 :V
REQUESTED SECTION                D2 :B39-B19
REQUEST TYPE                     D3 :OCCUPATION
OPERATION                        D4 :TRAVELING
TIME                             D5 :○○
```

FIG. 14

| # | REQUEST ||||| RESPONSE |||
|---|---|---|---|---|---|---|---|---|
| | TRAVELING VEHICLE INFORMATION D1 | REQUESTED SECTION D2 | REQUEST TYPE D3 | OPERATION D4 | GENERATED TIME D5 | SECTION D6 | RESPONSE TYPE D7 | OPERATION D8 | TIME D9 |
| 1 | ○○ | ○○ | ○○ | ○○ | ○○ | ○○ | ○○ | ○○ | ○○ |
| 2 | ○○ | ○○ | ○○ | ○○ | ○○ | ○○ | ○○ | ○○ | ○○ |
| 3 | ○○ | ○○ | ○○ | | | | | | |

| BLOCKING SECTION D11 | OCCUPATION INFORMATION | | | CONTROLLER SETTING INFORMATION D15 |
| --- | --- | --- | --- | --- |
| | TRAVELING VEHICLE INFORMATION D12 | OPERATION D13 | TIME D14 | |
| 1 | ○○ | ○○ | ○○ | ○○ |
| 2 | ○○ | ○○ | ○○ | ○○ |
| 3 | ○○ | ○○ | ○○ | ○○ |
| ⋮ | | | | |

| | | | | | | | | | |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |

| BLOCKING SECTION D11 | OCCUPATION INFORMATION | | | CONTROLLER SETTING INFORMATION D15 |
|---|---|---|---|---|
| | TRAVELING VEHICLE INFORMATION D12 | OPERATION D13 | TIME D14 | |
| 43 | | | | |
| 44 | | | | |
| 45 | | | | |
| 46 | | | | |
| 47 | | | | |
| 48 | | | | |
| 49 | | | | |

FIG. 19

| | |
|---|---|
| TRAVELING VEHICLE INFORMATION | D1 |
| SECTION | D6 |
| RESPONSE TYPE | D7 |
| OPERATION | D8 |
| TIME | D9 |

T6

TRAVELING VEHICLE SYSTEM AND TRAVELING VEHICLE CONTROL METHOD

TECHNICAL FIELD

This disclosure relates to a traveling vehicle system, and a traveling vehicle control method.

BACKGROUND

In manufacturing factories such as semiconductor manufacturing factories, a traveling vehicle system is used to transport articles such as transportation containers (FOUPs, reticle pods) that contain semiconductor wafers or reticles. A traveling vehicle system that includes a plurality of traveling vehicles traveling on a track and a controller that controls the plurality of traveling vehicles is known as such a traveling vehicle system. Each of the plurality of traveling vehicles transmits information such as its current location to the controller by wireless communication or the like. The controller determines a traveling vehicle to handle transportation of an article on the basis of the location of the traveling vehicle and so forth, and transmits a transport instruction to the traveling vehicle.

The track used in the above traveling vehicle system typically has a plurality of intersections. For each intersection, a blocking section is designated which undergoes, when occupied by one of a plurality of traveling vehicles, exclusive control to prohibit another traveling vehicle from moving thereinto. The traveling vehicles are controlled to be 1) able to occupy and pass through the blocking sections when occupation permission for the blocking sections is granted by the controller and 2) prohibited to move into the blocking sections when the occupation permission is not granted by the controller.

As the exclusive control mentioned above, there is known a configuration in which, by checking the traveling route of a traveling vehicle, a controller grants the traveling vehicle an occupation permission only for sections that are permissible among a plurality of blocking sections through which the traveling vehicle is supposed to pass (for example, see Japanese Unexamined Patent Application, First Publication No. S63-163608).

In the configuration of JP '608, exclusive control is executed where, of all blocking sections through which a traveling vehicle is supposed to pass through, blocking sections up to a permissible blocking section are demarcated and permitted. Thus, a scenario is possible in which before a traveling vehicle finishes passing through permitted blocking sections, the traveling vehicle stops once and performs a predetermined operation. If a permission is also preliminarily obtained for blocking sections through which the traveling vehicle is supposed to pass before performing the predetermined operation, these blocking sections are occupied more than necessary while the traveling vehicle is performing the predetermined operation, resulting in a problem that the operation of another vehicle is hindered.

It could therefore be helpful to avoid hindrance to the operation of another traveling vehicle associated with exclusive control to the utmost extent while suppressing interference between traveling vehicles by exclusive control.

SUMMARY

We thus provide:

A traveling vehicle system comprising: a plurality of traveling vehicles; and a controller that is capable of communicating with the plurality of traveling vehicles and that controls the plurality of traveling vehicles, a traveling region of the traveling vehicles having designated therein a plurality of blocking sections each of which undergoes, when occupied by one of the plurality of traveling vehicles, exclusive control to prohibit another traveling vehicle from moving thereinto, and the traveling vehicle being controlled to be able to occupy and operate in the blocking sections when an occupation permission for the blocking sections is granted by the controller and to be prohibited to operate in the blocking sections when the occupation permission is not granted by the controller, wherein the controller determines, where in a series of operations to be executed by the traveling vehicle, the operation of the traveling vehicle from the start of traveling to stopping before executing a predetermined operation included in the series of operations is demarcated, whether or not to grant the traveling vehicle an occupation permission for the blocking sections to be occupied for the traveling vehicle to execute operations.

After executing the exclusive control regarding the blocking sections to be occupied for the traveling vehicle, in a series of operations to be executed by the traveling vehicle, to travel until stopping at a predetermined stop position immediately before performing a transfer operation to transfer an article to an transfer destination, the controller may execute the exclusive control regarding the blocking section to be occupied for the transfer operation performed by the traveling vehicle. The traveling vehicle may transmit to the controller, as separate requests, a first occupation permission request regarding the blocking sections to be occupied therefor to travel until stopping at the predetermined stop position, and a second occupation permission request regarding the blocking section to be occupied for the transfer operation, and the controller may execute the exclusive control regarding the second occupation permission request after having executed the exclusive control regarding the first occupation permission request. The predetermined stop position may be the blocking section for executing the transfer operation or the blocking section adjacent to the blocking section for executing the transfer operation.

After executing the exclusive control regarding the blocking sections to be occupied for the traveling vehicle, in a series of operations to be executed by the traveling vehicle, to travel until stopping at a position for performing a direction change, the controller may execute the exclusive control regarding the blocking sections to be occupied for the traveling vehicle to travel after performing the direction change. The traveling vehicle may transmit to the controller, as separate requests, a third occupation permission request regarding the blocking sections to be occupied therefor to travel until stopping at a position to perform the direction change, and a fourth occupation permission request regarding the blocking sections to be occupied for traveling after performing the direction change, and the controller may execute the exclusive control regarding the fourth occupation permission request after having executed the exclusive control regarding the third occupation permission request.

After executing the exclusive control regarding the blocking sections to be occupied for the traveling vehicle, in a series of operations to be executed by the traveling vehicle, to travel until stopping at a position for performing charging, the controller may execute the exclusive control regarding the blocking sections to be occupied for the traveling vehicle to travel after performing the charging. The traveling vehicle may transmit to the controller, as separate requests, a fifth occupation permission request regarding the blocking sections to be occupied therefor to travel until stopping at a position to perform the charging, and a sixth occupation permission request regarding the blocking sections to be occupied for traveling after performing the charging, and the controller may execute the exclusive control regarding the sixth occupation permission request after having executed the exclusive control regarding the fifth occupation permission request.

The traveling vehicle system may comprise a grid-patterned track that has a plurality of first tracks extending along a first direction, and a plurality of second tracks extending along a second direction, which is different from the first direction, and that forms a plurality of cells with the plurality of first tracks and the plurality of second tracks, wherein the plurality of traveling vehicles travel on the first tracks or the second tracks along the grid-patterned track, and the blocking section is set for each grid cell, which is one of the cells in the grid-patterned track.

A traveling vehicle control method is a traveling vehicle control method in a traveling vehicle system including a plurality of traveling vehicles and a controller that is capable of communicating with the plurality of traveling vehicles and that controls the plurality of traveling vehicles, a traveling region of the traveling vehicles having designated therein a plurality of blocking sections each of which undergoes, when occupied by one of the plurality of traveling vehicles, exclusive control to prohibit another traveling vehicle from moving thereinto, and the traveling vehicle being controlled to be able to occupy and operate in the blocking sections when an occupation permission for the blocking sections is granted by the controller and to be prohibited to operate in the blocking sections when the occupation permission is not granted by the controller, the method comprising making the controller determine, where in a series of operations to be executed by the traveling vehicle, the operation of the traveling vehicle from the start of traveling to stopping before executing a predetermined operation included in the series of operations is demarcated, whether or not to grant the traveling vehicle an occupation permission for the blocking sections to be occupied for the traveling vehicle to execute operations.

According to the traveling vehicle system and the traveling vehicle control method, compared to a method of performing exclusive control for all sections through which a traveling vehicle is supposed to pass, it is possible to reduce the number of blocking sections to be temporarily occupied, by performing exclusive control where in a series of operations to be executed by a traveling vehicle, the operation up to stopping before executing a predetermined operation is demarcated. That is to say, it is possible to avoid hindrance to the operation of another traveling vehicle to the utmost extent while suppressing interference with other traveling vehicles by exclusive control.

In the configuration in which after executing the exclusive control regarding the blocking sections to be occupied for the traveling vehicle, in a series of operations to be executed by the traveling vehicle, to travel until stopping at a predetermined stop position immediately before performing a transfer operation to transfer an article to an transfer destination, the controller executes the exclusive control regarding the blocking section to be occupied for the transfer operation performed by the traveling vehicle, compared to a configuration of executing exclusive control at once for blocking sections for traveling until stopping at a predetermined stop position and a blocking section that executes a transfer operation, it is possible to reduce the number of blocking sections to be temporarily occupied. In the configuration in which the traveling vehicle transmits to the controller, as separate requests, a first occupation permission request regarding the blocking sections to be occupied therefor to travel until stopping at the predetermined stop position, and a second occupation permission request regarding the blocking section to be occupied for the transfer operation, and the controller executes the exclusive control regarding the second occupation permission request after having executed the exclusive control regarding the first occupation permission request, the traveling vehicle side transmits the first and second occupation permission requests, and it is therefore possible to distribute the load. In the configuration in which the predetermined stop position is the blocking section for executing the transfer operation or the blocking section adjacent to the blocking section that executes the transfer operation, the traveling vehicle is caused to travel to a position close to the position of executing the transfer operation, and it is therefore possible to reduce the number of blocking sections to be occupied for the transfer operation.

In the configuration in which after executing the exclusive control regarding the blocking sections to be occupied for the traveling vehicle, in a series of operations to be executed by the traveling vehicle, to travel until stopping at a position for performing a direction change, the controller executes the exclusive control regarding the blocking sections to be occupied for the traveling vehicle to travel after performing the direction change, compared to a configuration of executing exclusive control at once for blocking sections for traveling until stopping at a position for performing a direction change as well as blocking sections for traveling after performing the direction change, it is possible to reduce the number of blocking sections to be temporarily occupied. In the configuration in which the traveling vehicle transmits to the controller, as separate requests, a third occupation permission request regarding the blocking sections to be occupied therefor to travel until stopping at a position for performing the direction change, and a fourth occupation permission request regarding the blocking sections to be occupied for traveling after performing the direction change, and the controller executes the exclusive control regarding the fourth occupation permission request after having executed the exclusive control regarding the third occupation permission request, the traveling vehicle transmits the third and fourth occupation permission requests, and it is therefore possible to distribute the load.

In the configuration in which after executing the exclusive control regarding the blocking sections to be occupied for the traveling vehicle, in a series of operations to be executed by the traveling vehicle, to travel until stopping at a position for performing charging, the controller executes the exclusive control regarding the blocking sections to be occupied for the traveling vehicle to travel after performing the charging, compared to a configuration of executing exclusive control at once for blocking sections for traveling until stopping at a position for performing charging as well as blocking sections for traveling after performing the charging, it is possible to reduce the number of blocking sections to be temporarily occupied. In the configuration in which the traveling vehicle transmits to the controller, as separate requests, a fifth occupation permission request regarding the blocking sections to be occupied therefor to travel until stopping at a position for performing the charging, and a sixth occupation permission request regarding the blocking sections to be occupied for traveling after performing the charging, and the controller executes the exclusive control regarding the sixth occupation permission request after having executed the exclusive control regarding the fifth occupation permission request, in a mode in which whether or not to permit is determined and a permission is granted if an occupation permission request is present, the traveling vehicle side determines the timing of transmitting the fifth and sixth occupation permission requests according to the position thereof, and it is therefore possible to distribute the load.

In the configuration that includes a grid-patterned track that has a plurality of first tracks extending along a first direction, and a plurality of second tracks extending along a second direction, which is different from the first direction, and that forms a plurality of cells with the plurality of first tracks and the plurality of second tracks, wherein the plurality of traveling vehicles travel on the first tracks or the second tracks along the grid-patterned track, and the blocking section is set for each grid cell, which is one of the cells in the grid-patterned track, a traveling vehicle in a stop state at any grid cell hinders the traveling of another traveling vehicle since all of the grid cells of a grid-patterned track are intersections. Therefore, in a grid-patterned track, hindrance to the traveling of another traveling vehicle is likely to reduce the traveling efficiency in comparison to a traveling vehicle system configuration having tracks other than a grid-patterned track. However, according to the above configuration, it is possible to suppress the reduction in the traveling efficiency mentioned above.

BRIEF DESCRIPTION OF THE DRAWINGS

FIG. 7 is a diagram showing an example of a traveling occupation request.

FIGS. 8(A) to (C) are diagrams showing examples of transfer occupation requests.

FIG. 10 is a diagram showing examples of occupation requests.

FIG. 12 is a diagram showing examples of charging-related occupation requests.

FIG. 14 is a diagram showing an example of request management information.

FIG. 16 is a diagram showing an example of occupation management information.

FIG. 17 is a diagram showing an example of a determination performed by an occupation request determiner.

FIG. 19 is a diagram showing an example of response information.

DESCRIPTION OF REFERENCE SIGNS

Figure 1:
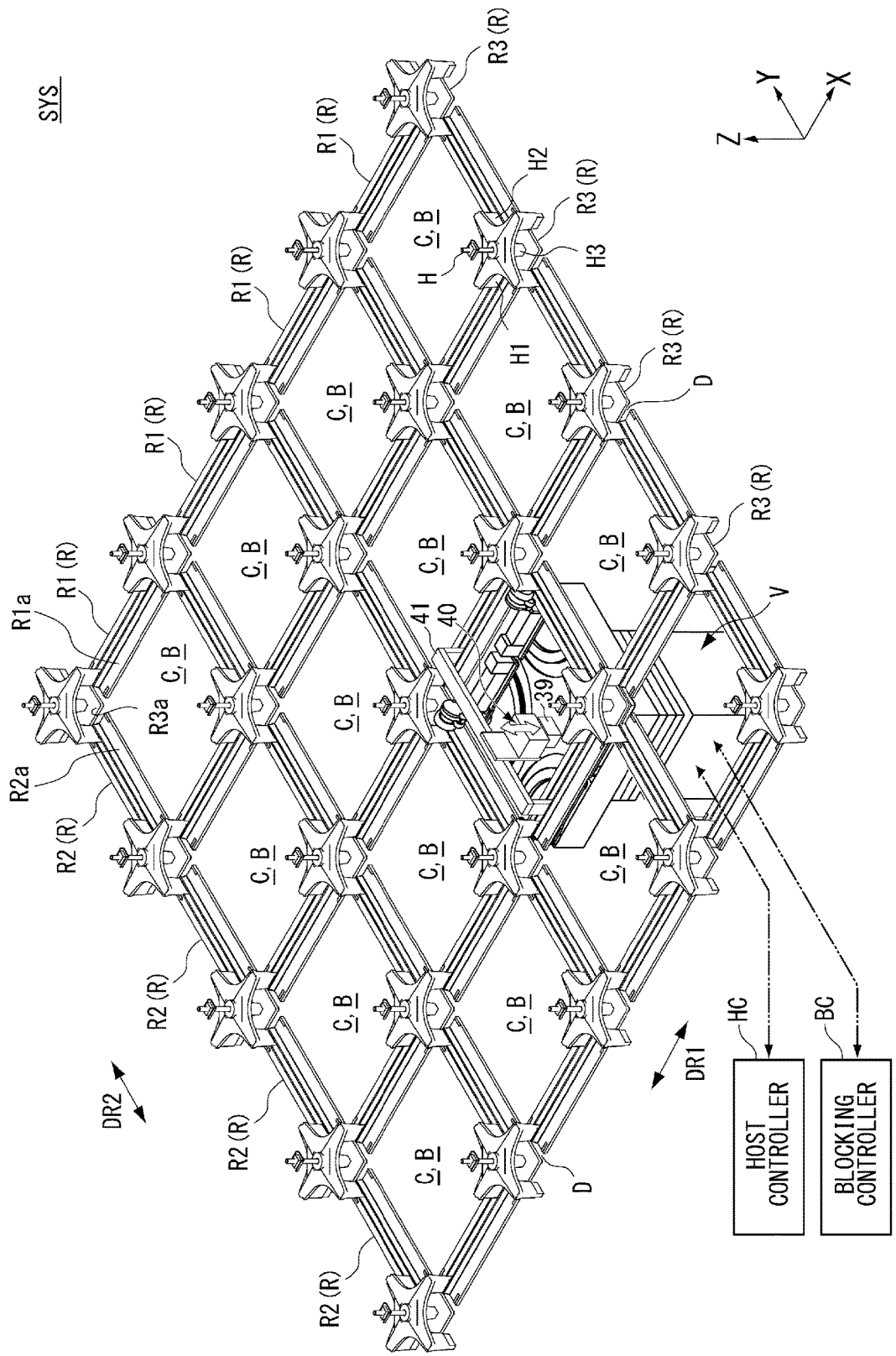
FIG. 1 is a perspective view showing a traveling vehicle system according to a first example.

SYS, SYS2: Traveling vehicle system
B, BA, B1 to B60: Blocking section
C, C1 to C60: Grid cell
HC: Host controller
BC: Blocking controller
M: Article
R: Grid-patterned track, track
RA: Track
V, V1 to Vn: Traveling vehicle
10: Main body
18: Transferer
20: Traveler
30: Coupler
34: Direction changer
50: Controller
51: Memory storage
52: Communicator
53: Traveling controller
54: Transfer controller
55: Charging controller
56: Occupation requester
57: Release requester
58: State information processor
61: Memory storage
62: Communicator
63: Occupation request processor
64: Occupation request determiner
65: Release request processor
66: Release request determiner
67: Responder
CM1, CM2: Transport instruction
RQA: Occupation request
RQB: Release request

DETAILED DESCRIPTION

The following describes examples with reference to the drawings. However, our systems and methods are not limited to the examples. In the drawings, scale is changed as necessary to illustrate the examples such as by enlarging or emphasizing a portion. In the following drawings, an XYZ coordinate system is used to describe the directions in each figure. In the XYZ coordinate system, a plane that is parallel to a horizontal plane is defined as an XY plane. A direction along this XY plane is denoted as X direction, and a direction orthogonal to the X direction is denoted as Y direction. The traveling direction of the traveling vehicle V can change from the state shown in the following figures to another direction, and may also travel along, for example, a curved direction in some instances. A direction perpendicular to the XY plane is denoted as Z direction. For each of the X direction, the Y direction, and the Z direction, description is made with a definition in which a direction indicated by an arrow is the positive (+) direction and a direction opposite to the direction indicated by the arrow is the negative (−) direction. Moreover, the pivoting direction around the vertical axis or the Z axis is referred to as θZ direction.

First Example

Figure 2:
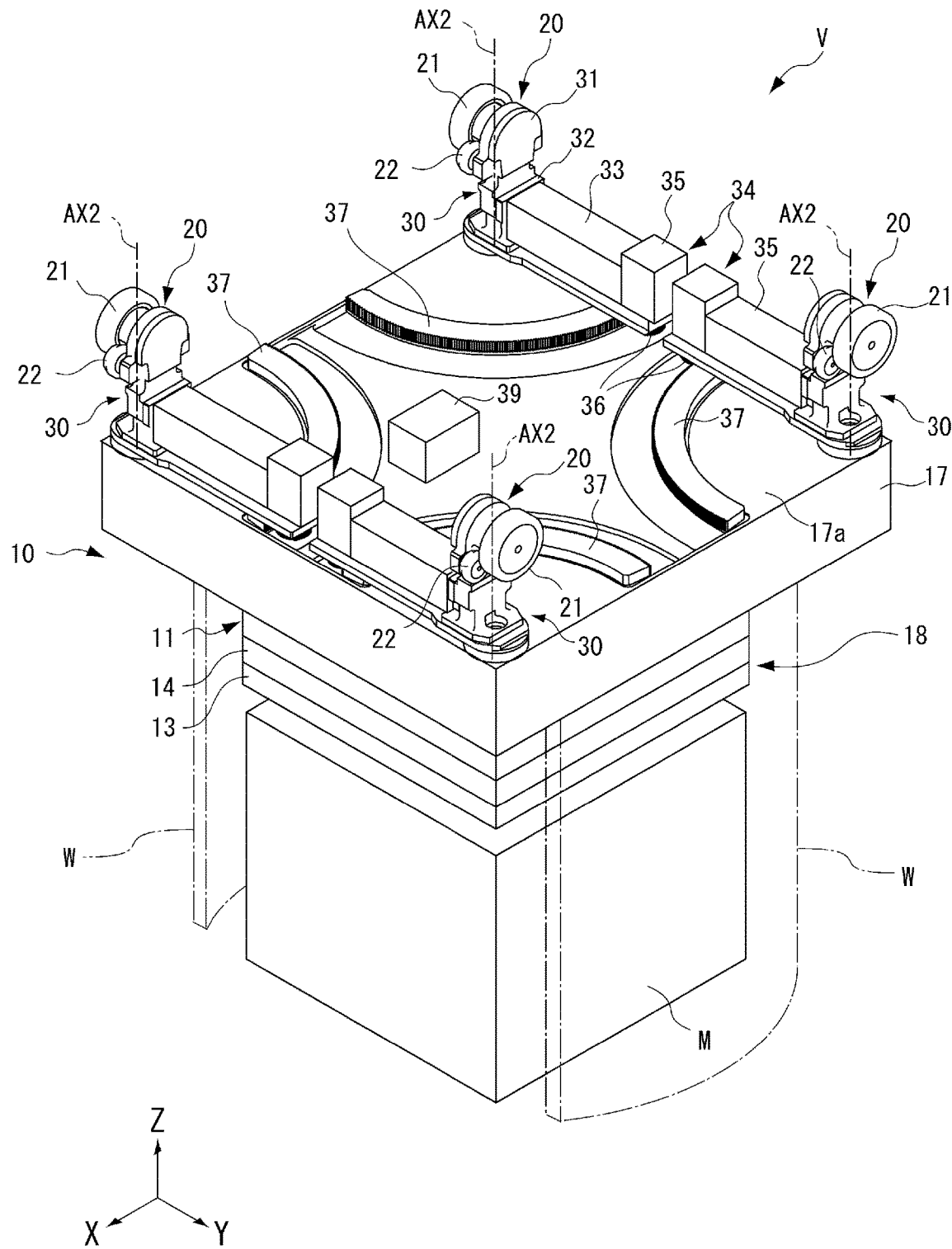
FIG. 2 is a perspective view showing an example of a traveling vehicle.
Figure 3:
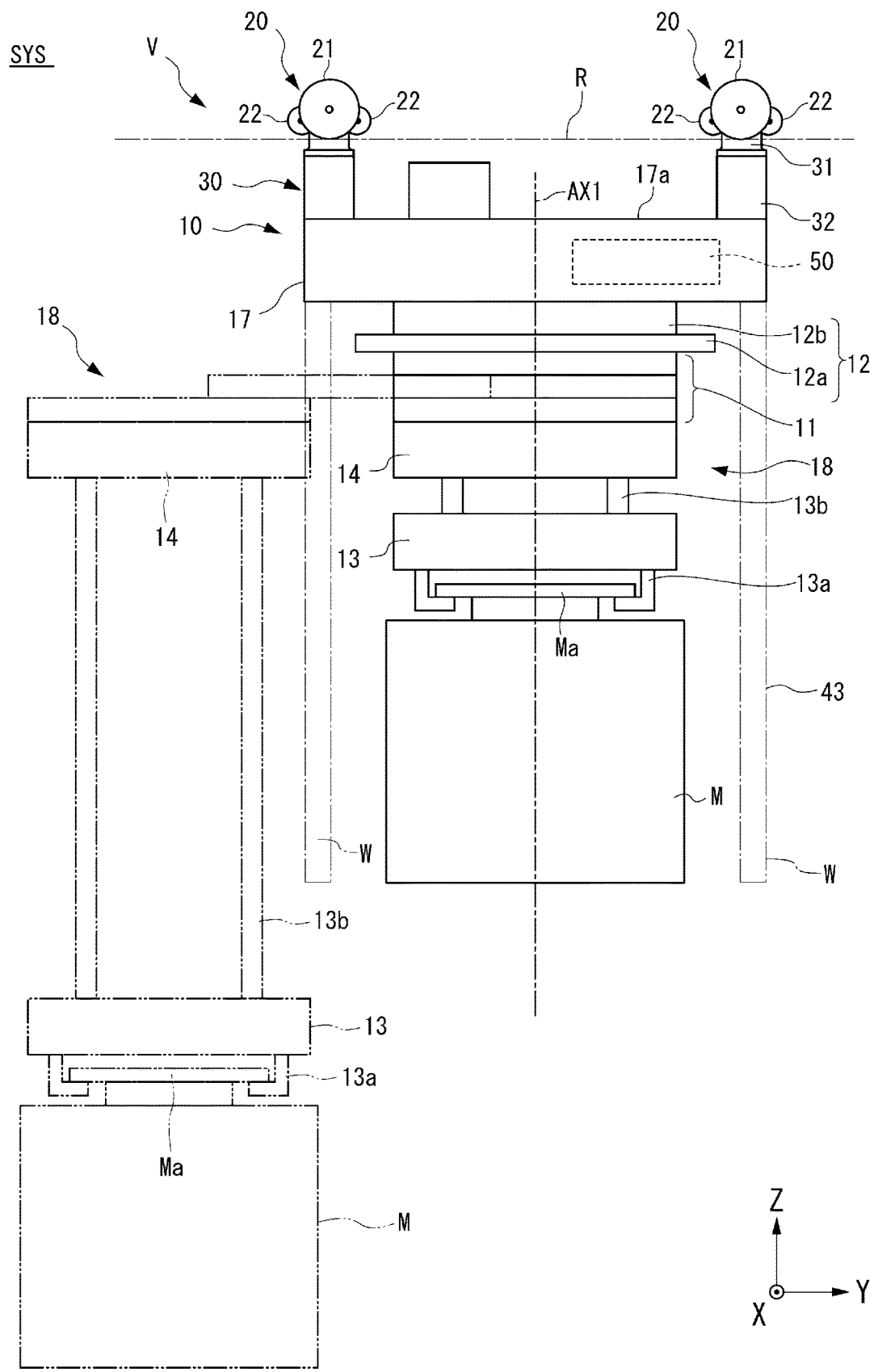
FIG. 3 is a side view showing an example of the traveling vehicle.
Figure 4:
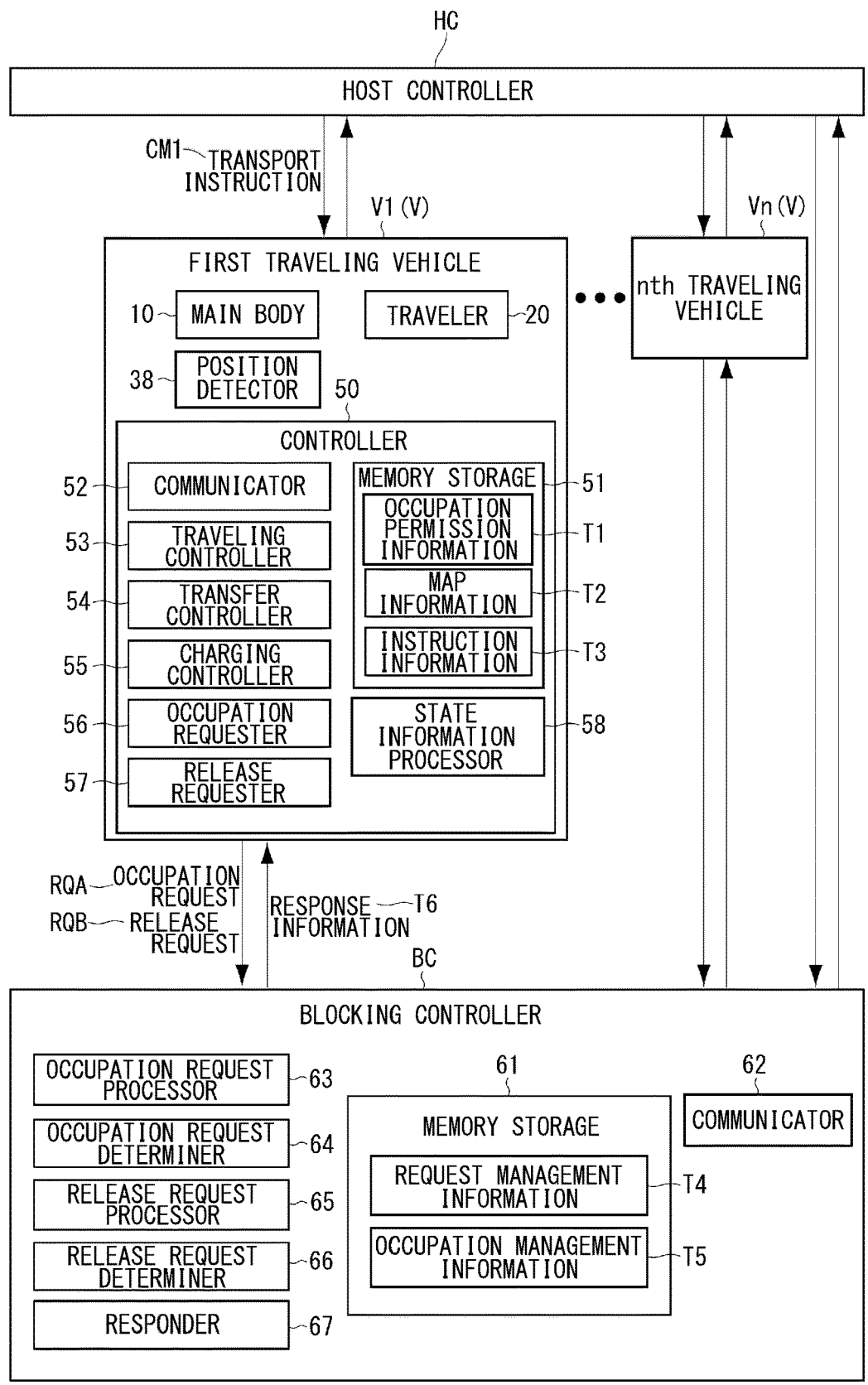
FIG. 4 is a block diagram showing an example of a traveling vehicle, a host controller, and a blocking controller.

FIG. 1 is a perspective view showing a traveling vehicle system SYS according to a first example. FIG. 2 is a perspective view of a traveling vehicle V used in the traveling vehicle system SYS shown in FIG. 1. FIG. 3 is a side view showing an example of the traveling vehicle V. FIG. 4 is a block diagram showing an example of the traveling vehicle V, a host controller HC, and a blocking controller BC.

The traveling vehicle system SYS is a system that transports articles M by traveling vehicles V in a clean room of a semiconductor manufacturing factory, for example. The traveling vehicle system SYS includes a first traveling vehicle V1 to an nth traveling vehicle Vn (may be collectively referred to as traveling vehicles V) (see FIG. 4), and controllers (host controller HC, blocking controller BC) that control the plurality of traveling vehicles V. An example will be described in which the traveling vehicles V are overhead traveling vehicles. The traveling vehicles V move along a track R of the traveling vehicle system SYS. The track R is a traveling region of the traveling vehicles V. The traveling vehicles V move along the track R of the traveling vehicle system SYS and transport articles M such as FOUPs accommodating semiconductor wafers or reticle pods accommodating reticles. The traveling vehicles V articles M, and may hence be referred to as transport vehicles.

The track R is installed on or in the vicinity of a ceiling of a building having therein a clean room or the like. The track R is provided adjacent to a processing apparatus (not shown in the drawings), a stocker (automated warehouse, not shown in the drawings), a buffer (not shown in the drawings), and so forth. The above processing apparatus is, for example, an exposure apparatus, a coater/developer, a film forming apparatus, or an etching apparatus, and performs various processes on semiconductor wafers in containers transported by the traveling vehicles V. The stocker mentioned above stores articles M transported by the traveling vehicles V. The buffer mentioned above temporarily stores articles M transported by the traveling vehicles V.

The track R is an example of the form of a track. The track R is a grid-patterned track having a plurality of first tracks R1, a plurality of second tracks R2, and a plurality of intersections R3. The track R is referred to as grid-patterned track R. The plurality of first tracks R1 each extend along the X direction (first direction DR1). The plurality of second tracks R2 each extend along the Y direction (second direction DR2). The grid-patterned track R is formed in a grid pattern as seen in a plan view, with the plurality of first tracks R1 and the plurality of second tracks R2. The grid-patterned track R forms a plurality of cells with the plurality of first tracks R1 and the plurality of second tracks R2. The first direction DR1 and the second direction DR2 are orthogonal to each other, and the plurality of first tracks R1 and the plurality of second tracks R2 are provided along the directions orthogonal to each other but not intersecting directly with each other. The intersection R3 is arranged at a portion where the first track R1 and the second track R2 intersect with each other. The intersection R3 is adjacent to the first track R1 in the first direction DR1, and is adjacent to the second track R2 in the second direction DR2. The intersection R3 is a connection track that connects the first track R1 and the second track R2, connects the first tracks R1 to each other, and connects the second tracks R2 to each other. The intersection R3 is a track that is used in any configurations where the traveling vehicle V travels along the first tracks R1, where the traveling vehicle V travels along the second tracks R2, and where the traveling vehicle V travels from the first track R1 to the second track R2 or from the second track R2 to the first track R1. In the grid-patterned track R, the plurality of first tracks R1 and the plurality of second tracks R2 orthogonally intersect with each other, thereby establishing a state where a plurality of grid cells C (cells) are adjacent to each other as seen in a plan view. One grid cell C corresponds to one cell, and is a portion surrounded, as seen in a plan view, by two first tracks R1 adjacent to each other in the second direction DR2 and by two second tracks R2 adjacent to each other in the first direction DR1. FIG. 1 shows a part of the grid-patterned track R, and the grid-patterned track R is formed such that a configuration similar to that shown in the figure continues in the first direction DR1 (X direction) and in the second direction DR2 (Y direction).

The first tracks R1, the second tracks R2, and the intersections R3 are suspended from a ceiling not shown in the drawings by suspenders H (see FIG. 1). Each suspender H has first portions H1 to suspend the first track R1, second portions H2 to suspend the second track R2, and a third portion H3 to suspend the intersection R3. The first portion H1 and the second portion H2 are each provided at two opposing locations with the third portion H3 therebetween.

The first track R1, the second track R2, and the intersection R3 each have traveling surfaces R1a, R2a, and R3a on which traveling wheels 21 described later of the traveling vehicle V travel. A clearance D is formed between the first track R1 and the intersection R3, and between the second track R2 and the intersection R3, respectively. The clearance D is a portion through which a coupler 30 (described later) serving as a part of the traveling vehicle V passes when the traveling vehicle V having traveled on the first track R1 crosses the second track R2 or when the traveling vehicle V having traveled on the second track R2 crosses the first track R1. Therefore, the clearance D is provided with a width that allows the coupler 30 to pass therethrough. The first tracks R1, the second tracks R2, and the intersections R3 are provided along the same or substantially the same horizontal plane. The first tracks R1, the second tracks R2, and the intersections R3 are such that the traveling surfaces R1a, R2a, and R3a thereof are arranged on the same or substantially the same horizontal plane.

The traveling vehicle system SYS includes a communication system (not shown). The communication system is used for communication of the traveling vehicles V, the host controller HC, and the blocking controller BC. The traveling vehicles V, the host controller HC, and the blocking controller BC are all communicably connected via the communication system.

In a traveling region of the traveling vehicles V, a plurality of blocking sections B are designated (see FIG. 1), each of which undergoes, when occupied by one of the plurality of traveling vehicles V, exclusive control to prohibit another traveling vehicle V from moving thereinto. The blocking section B is set for each grid cell C. The traveling vehicle V is controlled to be able to occupy and operate in the blocking sections B when an occupation permission for the blocking sections B is granted by the blocking controller BC and to be prohibited to operate in the blocking sections B when the occupation permission is not granted by the blocking controller BC. Interference between the traveling vehicles V can be prevented by exclusive control, and the exclusive control will be further described later.

A configuration of the transport vehicle V will now be described. As shown in FIGS. 2 to 4, the traveling vehicle V has a main body 10, travelers 20, couplers 30, and a controller 50 (see FIGS. 3 and 4).

The main body 10 is arranged below the grid-patterned track R (on the −Z side). The main body 10 is formed, for example, in a rectangular shape as viewed in a plan view. The main body 10 is formed in a size that fits in a single grid cell C (see FIG. 1) in the grid-patterned track R as seen in a plan view. As a result, a space is ensured for traveling vehicles V traveling respectively on the first track R1 and the second track R2 adjacent to each other to pass one another. The main body 10 includes an upper unit 17 and a transferer 18. The upper unit 17 is suspended from the travelers 20 via the couplers 30. The upper unit 17 is, for example, of a rectangular shape as seen in a plan view, and has four corners on the upper surfaces 17a.

The main body 10 has a traveling wheel 21, a coupler 30, and a direction changer 34 at each of the four corners. In this configuration, the traveling wheels 21 arranged at the four corners of the main body 10 enable stable suspension of the main body 10 and stable traveling of the main body 10.

The transferer 18 is provided below the upper unit 17. The transferer 18 can rotate around the rotation axis AX1 along the Z direction (vertical direction). The transferer 18 has an article holder 13 to hold an article M, a lift driver 14 to raise or lower the article holder 13 in the vertical direction, a lateral extender 11 to move the lift driver 14 in the horizontal direction, and a rotator 12 to hold the lateral extender 11. The article holder 13 grasps the flange Ma of an article M to thereby suspend and hold the article M. The article holder 13 is, for example, a chuck having claws 13a movable in the horizontal direction, and inserts the claws 13a under the flange Ma of the article M and raises the article holder 13, to thereby hold the article M. The article holder 13 is connected to suspenders 13b such as wires and belts.

The lift driver 14 is, for example, a hoist, and lowers the article holder 13 by feeding out suspenders 13b and raises the article holder 13 by taking up the suspenders 13b. The lift driver 14 is controlled by the controller 50 to raise or lower the article holder 13 at a predetermined speed. Also, the lift driver 14 is controlled by the controller 50 to maintain the article holder 13 at a target height.

The lateral extender 11 has a plurality of movable plates arranged stacked, for example, in the Z direction. The movable plates can move relatively in the Y direction. The lift driver 14 is mounted on the lowermost movable plate. The lateral extender 11 can laterally extend (slide and move) the lift driver 14 and the article holder 13 attached to the lowermost movable plate, for example, in the horizontal direction orthogonal to the traveling direction of the traveling vehicle V, by moving the movable plates by a driver not shown in the drawings.

The rotator 12 is provided between the lateral extender 11 and the upper unit 17. The rotator 12 has a rotation member 12a and a rotation driver 12b. The rotation member 12a is provided to be rotatable in an axial direction around the vertical direction. The rotation member 12a supports the lateral extender 11. The rotation driver 12b uses, for example, an electric motor or the like, and causes the rotation member 12a to rotate in the axial direction around the rotation axis AX1. The rotator 12 can, by rotating the rotation member 12a by the driving force from the rotation driver 12b, rotate the lateral extender 11 (lift driver 14 and article holder 13) in the axial direction around the rotation axis AX1. The traveling vehicle V can receive or deliver the article M from or to a predetermined position, using the transferer 18.

As shown in FIGS. 2 and 3, a cover W may be provided to surround the transferer 18 and the article M held by the transferer 18. The cover W is of a cylindrical shape having an open-ended bottom, and is also of a shape having a cutout portion through which the movable plates of the lateral extender 11 project. The upper end of the cover W is attached to the rotation member 12a of the rotator 12, and the cover W rotates axially around the rotation axis AX1 as the rotating member 12a rotates.

Each traveler 20 has a traveling wheel 21 and auxiliary wheels 22. The traveling wheel 21 is arranged in each of the four corners on the upper surface 17a of the upper unit 17 (main body 10). Each traveling wheel 21 is attached to an axle provided in the coupler 30. The axle is provided in parallel or substantially parallel along the XY plane. Each traveling wheel 21 is driven to rotate by the driving force of a traveling driver 33, which will be described later. Each traveling wheel 21 rolls on the traveling surfaces R1a, R2a, and R3a of the first track R1, the second track R2, and the intersection R3 of the track R, causing the traveling vehicle V to travel. The configuration is not limited to driving all of the four traveling wheels 21 to rotate by the drive force of the traveling driver 33, and some of the four traveling wheels 21 may be driven to rotate.

Each traveling wheel 21 is provided to be able to pivot in the θZ direction around the pivot axis AX2. The traveling wheel 21 is pivoted in the θZ direction by the direction changer 34 described later, and as a result, the traveling direction of the traveling vehicle V can be changed. The auxiliary wheels 22 are each arranged in front and rear of the traveling wheel 21 in the traveling direction. As with the traveling wheel 21, each auxiliary wheel 22 can rotate around the axis of the axle, which is parallel or substantially parallel along the XY plane. The lower end of the auxiliary wheel 22 is set to be higher than the lower end of the traveling wheel 21. Therefore, when the traveling wheel 21 is traveling on the traveling surfaces R1a, R2a, and R3a, the auxiliary wheel 22 does not come into contact with the traveling surfaces R1a, R2a, and R3a. When the traveling wheel 21 passes through the clearance D (see FIG. 1), the auxiliary wheels 22 come into contact with the traveling surfaces R1a, R2a, and R3a to prevent the traveling wheel 21 from falling. The configuration is not limited to providing two of the auxiliary wheels 22 for a single traveling wheel 21 and, for example, a single auxiliary wheel 22 may be provided for a single traveling wheel 21, or no auxiliary wheel 22 may be provided.

As shown in FIG. 2, the couplers 30 connect the upper unit 17 of the main body 10 and the travelers 20. The coupler 30 is provided at each of the four corners on the upper surface 17a of the upper unit 17 (main body 10). The main body 10 is suspended from the travelers 20 via the couplers 30 and is arranged below the grid-patterned track R. The coupler 30 has a supporter 31 and a connection member 32. The supporter 31 rotatably supports the rotation shaft of the traveling wheel 21 and the rotation shafts of the auxiliary wheels 22. The supporter 31 maintains the relative position between the traveling wheel 21 and the auxiliary wheels 22. The supporter 31 is formed, for example, in a plate shape with a thickness that allows it to pass through the clearance D (see FIG. 1).

The connection members 32 each extend downward from the supporter 31 and is coupled to the upper surface 17a of the upper unit 17 to hold the upper unit 17. The connector 32 includes a transmission therein to transmit the driving force of the traveling driver 33 (to be described below) to the traveling wheel 21. This transmission may be of a configuration in which a chain or a belt is used, or a configuration in which a gear train is used. The connection member 32 is provided to be able to pivot in the θZ direction around the pivot axis AX2. The pivoting of the connection member 32 around the pivot axis AX2 can cause the traveling wheel 21 to pivot around the pivot axis AX2 in the θZ direction via the supporter 31.

The traveling driver 33 and the direction changer 34 are provided in the coupler 30 (see FIG. 2). The traveling driver 33 is attached to the connector 32. The traveling driver 33 is a drive source to drive the traveling wheel 21 and, for example, an electric motor or the like is used therefor. Each of the four traveling wheels 21 is driven by the traveling driver 33 to serve as a driving wheel. The four traveling wheels 21 are controlled by the controller 50 to have the same or substantially the same rotation speed. If any one of the four traveling wheels 21 is not used as a driving wheel, the traveling driver 33 is not attached to the connection member 32 thereof.

The direction changer 34 causes the connection member 32 of the coupler 30 to turn around the pivot axis AX2 to thereby cause the traveling wheel 21 to pivot around the pivot axis AX2 in the θZ direction. It is possible, by pivoting the traveling wheel 21 in the θZ direction, to switch from a first state where the traveling direction of the traveling vehicle V is the first direction DR1 to a second state where the traveling direction is the second direction DR2, or from the second state where the traveling direction is the second direction DR2 to the first state where the traveling direction is the first direction DR1.

The direction changer 34 has a drive source 35, a pinion gear 36, and a rack 37. The drive source 35 is attached to a side surface of the traveling driver 33 away from the pivot axis AX2. As the drive source 35, for example, an electric motor or the like is used. The pinion gear 36 is attached to the lower surface side of the drive source 35, and driven to rotate in the θZ direction by the driving force generated by the drive source 35. The pinion gear 36 is of a circular shape as seen in a plan view and has a plurality of teeth on the outer circumference thereof along the circumferential direction. The rack 37 is fixed to the upper surface 17a of the upper unit 17. The rack 37 is provided at each of the four corners on the upper surface 17a of the upper unit 17, and is provided having an arc shape (sectorial shape) centered on the pivot axis AX2 of the traveling wheel 21. The rack 37 has a plurality of teeth which mesh with the teeth of the pinion gear 36, on the outer circumference thereof along the circumferential direction.

The pinion gear 36 and the rack 37 are arranged in the state where the teeth of the pinion gear 36 and the teeth of the rack 37 are in mesh with each other. As the pinion gear 36 rotates in the θZ direction, the pinion gear 36 moves in the circumferential direction around the pivot axis AX2 along the outer circumference of the rack 37. As a result of this movement of the pinion gear 36, the connection member 32 pivots, and the traveling driver 33 and the direction changer 34 pivot together with the pinion gear 36 in the circumferential direction and around the pivot axis AX2.

As a result of the pivoting of the direction changer 34, the traveling wheel 21 and the auxiliary wheels 22 arranged in each of the four corners on the upper surface 17a all pivot in the θZ direction around the pivot axis AX2 within a range of 90 degrees. The driving of the direction changer 34 is controlled by the controller 50. The controller 50 may instruct the four traveling wheels 21 to perform the pivoting operation at the same timing, or may instruct them to perform the pivoting operations at different timings. By causing the traveling wheel 21 and the auxiliary wheels 22 to pivot, the traveling wheel 21 shifts from the state of being in contact with one of the first track R1 and the second track R2 to the state of being in contact with the other. In other words, the traveling wheel 21 shifts from the state where the direction of the rotation axis of the traveling wheel 21 is one of the first direction DR1 and the second direction DR2 to the state where direction of the rotation axis of the traveling wheel 21 is the other. As a result, it is possible to switch between the first state where the traveling direction of the traveling vehicle V is the first direction DR1 (X direction) and the second state where the traveling direction is the second direction DR2 (Y direction).

The traveling vehicle V includes a position detector 38 that detects position information (see FIG. 4). The position detector 38 detects the current position of the traveling vehicle V by detecting a position marker (not shown in the drawings) indicating position information. The position detector 38 detects the position marker in a non-contact manner. The position marker is installed for each grid cell C of the grid-patterned track R.

The traveling vehicle V includes a charging electrode 39. The traveling vehicle V connects the charging electrode 39 to a charging terminal 40 (see FIG. 1) included in the traveling vehicle system SYS to thereby charge a battery (not shown) of the traveling vehicle V. The charging terminal 40 is arranged in a predetermined grid cell C. The charging terminal 40 is connected to a power source (not shown) to supply electric power to the battery of the traveling vehicle V. The charging terminal 40 is supported by a frame 41 and moves in the vertical direction. The frame 41 is fixed to one or both of the first track R1 and the second track R2. By moving in the vertical direction, the charging terminal 40 moves to a retracted position at which the charging terminal 40 does not interfere with the movement space of the traveling wheel 21, which will be described later, and a charging position at which the charging terminal 40 is connected to the charging electrode 39 of the traveling vehicle V.

Operations related to charging will now be described. When charging, the traveling vehicle V transmits to the blocking controller BC an occupation request for the grid cell C in which the charging terminal 40 is arranged. After having obtained a permission for this occupation request, the traveling vehicle V stops at the grid cell C, in which the charging terminal 40 is arranged. When the traveling vehicle V stops, a controller (not shown) of the charging terminal 40 receives from the host controller HC information indicating that the traveling vehicle V has stopped, and causes the charging terminal 40 to move from the retracted position to the charging position. Through this operation, the charging terminal 40 is connected to the charging electrode 39 of the traveling vehicle V, and the traveling vehicle V will be charged. After charging has finished, the controller of the charging terminal 40 receives from the traveling vehicle V information indicating that charging has finished, and causes the charging terminal 40 to move from the charging terminal to the retracted position. The configuration related to charging the traveling vehicle V is not limited to the configuration described above. For example, the traveling vehicle V may be charged in a manner of non-contact power feeding, or the frame 41 may be suspended from the ceiling. The controller of the charging terminal 40 may wirelessly acquire from the traveling vehicle V a signal indicating the arrival of the traveling vehicle V at the grid cell C, or may acquire a detection result indicating the arrival of the traveling vehicle V at the grid cell C, from a sensor arranged in the grid cell C.

The controller 50 comprehensively controls the traveling vehicle V. The controller 50 includes a memory storage 51 that memorizes (stores) various data, a communicator 52, a traveling controller 53, a transfer controller 54, a charging controller 55, an occupation requester 56, a release requester 57, and a state information processor 58. The controller 50 is a computer. While the example illustrates a controller 50 as being provided in the main body 10 (see FIG. 3), the controller 50 may be provided outside the main body 10.

The communicator 52 communicates with external devices. The communicator 52 is wirelessly connected to a communication system (not shown). The communicator 52 communicates with each of the host controller HC and the blocking controller BC via the communication system.

The traveling controller 53 controls traveling of the traveling vehicle V. The traveling controller 53 controls traveling by controlling the traveling driver 33, the direction changer 34 and so forth. The traveling controller 53 controls, for example, traveling speed, operations related to stopping, and operations related to direction changing. The traveling controller 53 controls traveling of the traveling vehicle V on the basis of a transport instruction CM1 described later.

The traveling controller 53 controls traveling so that the traveling vehicle V travels in accordance with an occupation permission for blocking sections B granted by the blocking controller BC. The occupation permission received from the blocking controller BC is stored in the memory storage 51 as occupation permission information T1. The occupation permission information T1 includes information indicating blocking sections B for which an occupation permission is granted. For example, when occupation of blocking sections B43 to B49 is permitted, the occupation permission information T1 is expressed as follows. "Blocking sections B43 to B49: Permitted." The occupation permission information T1 is updated to the latest information on the basis of response information T6, which will be described later. The traveling controller 53 controls traveling of the traveling vehicle V on the basis of the occupation permission information T1. The traveling controller 53 controls traveling of the traveling vehicle V so that the traveling vehicle V moves into the blocking sections B for which an occupation permission is granted and does not to move into blocking sections B for which an occupation permission has not been granted. When there are blocking sections B for which an occupation permission is not granted, the traveling controller 53 controls traveling of the traveling vehicle V so that the traveling vehicle V waits at a position just short of the blocking sections B, for which no occupation permission is granted, and does not to move into those blocking sections B.

The transfer controller 54 controls the transfer operation performed by the traveling vehicle V on the basis of the transport instruction CM1. The transfer controller 54 controls the transferer 18 and so forth to thereby control the transfer operation performed by the traveling vehicle V. The transfer controller 54 controls the pickup operation to grip an article M arranged at a predetermined location and the unloading operation to unload the held article M to a predetermined location.

The charging controller 55 controls operations related to charging. The charging controller 55 starts the operation of charging when the amount of electricity stored in the battery becomes equal to or less than a predetermined value. The charging controller 55 controls the traveling vehicle V to travel to the grid cell C in which the charging terminal 40 is arranged, and perform charging. The charging controller 55 causes the blocking controller BC via the occupation requester 56 to request for an occupation request regarding the blocking sections B required to travel to the grid cell C with the charging terminal 40 arranged therein and for performing charging.

The state information processor 58 periodically generates and updates state information (not shown in the drawings). The state information is stored in the memory storage 51. The state information processor 58 transmits the state information to the host controller HC and the blocking controller BC via the communicator 52. Examples of the state information include information on the current position of the traveling vehicle V, information indicating the current state of the traveling vehicle V such as normal or abnormal, and information on the state of various instructions (being executed, execution completed, execution failed) such as the transport instruction CM1 executed by the traveling vehicle V.

The occupation requester 56 requests for an occupation permission regarding a plurality of blocking sections B that are to be occupied by the traveling vehicle V of its own. The occupation requester 56 will be described later.

The release requester 57 requests the blocking controller BC to release the occupation of the blocking sections B for which an occupation permission has been granted. The release requester 57 will be described later.

Figure 5:
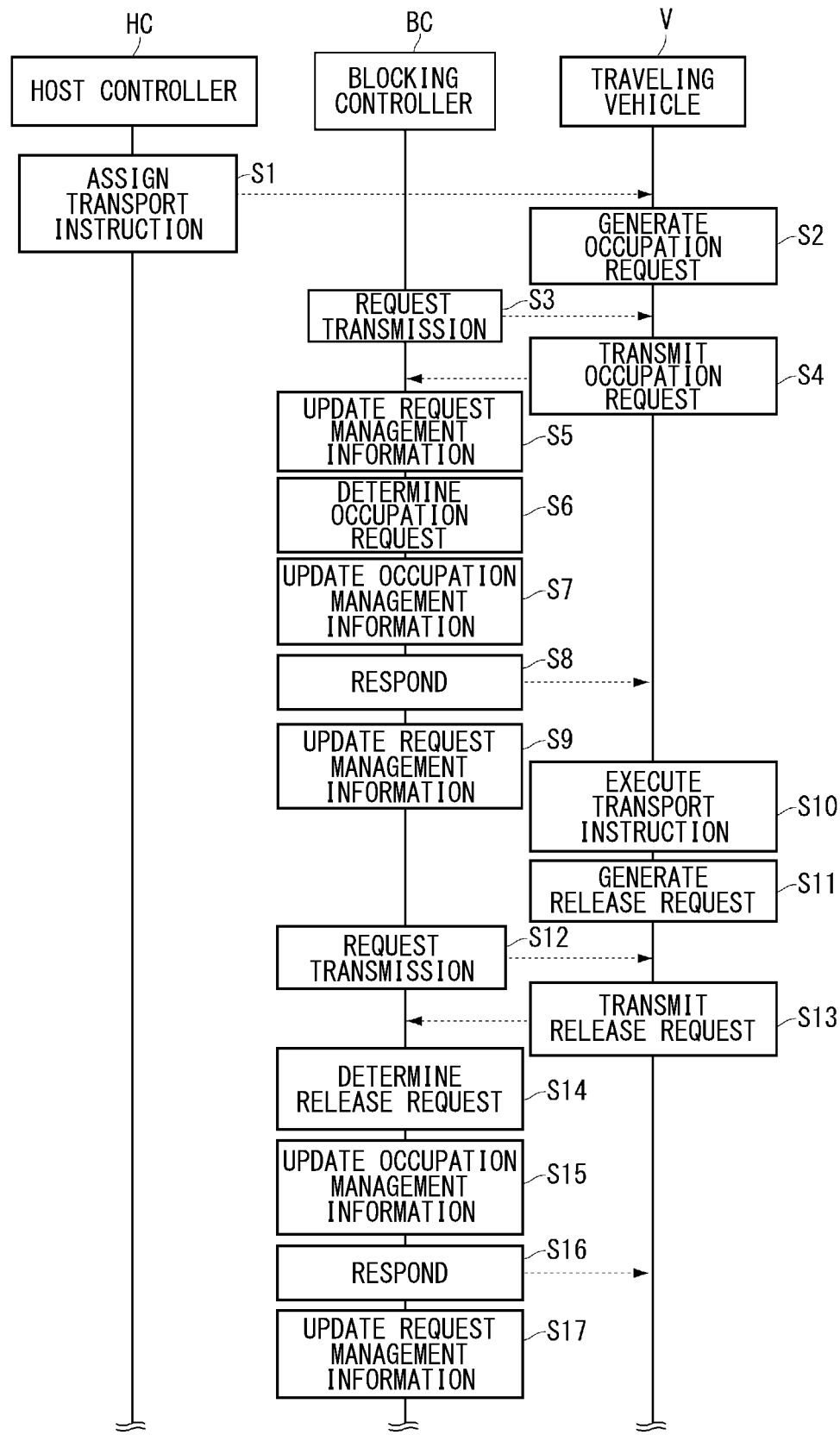
FIG. 5 is a sequence diagram showing an example of an operation of the traveling vehicle system.
Figure 6:
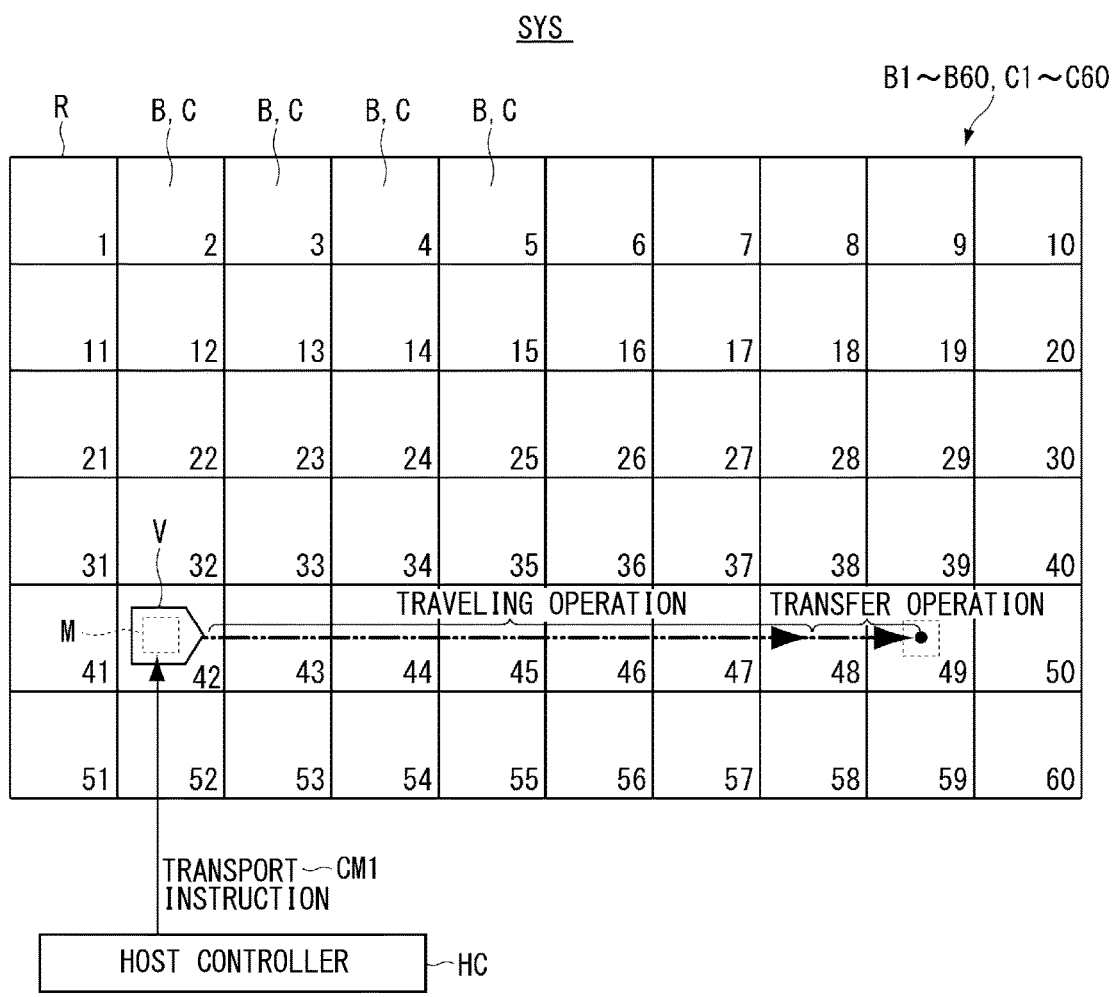
FIG. 6 is a diagram showing an example of transfer-related control of a traveling vehicle V performed by the traveling vehicle system.

Next, control of the traveling vehicles V performed by the host controller HC and the blocking controller BC will now be described. FIG. 5 is a sequence diagram showing an example of an operation of the traveling vehicle system SYS. FIG. 6 is a diagram showing an example of the transfer-related control of the traveling vehicle V performed by the traveling vehicle system SYS. The grid-patterned track R shown in the figures such as FIG. 6 illustrates a part of the entire grid-patterned track R. In the figures such as FIG. 6, grid cells C and blocking sections B in the portions denoted by digits "1 to 60" are grid cells C1 to C60 and blocking sections B1 to B60.

The host controller HC assigns a transport instruction CM1 to thereby control transportation (traveling) of the traveling vehicle V (Step S1 of FIG. 5). On the basis of system information, the host controller HC selects a traveling vehicle V capable of performing transportation, and assigns the transport instruction CM1 to the selected traveling vehicle V. The transport instruction CM1 is, for example, an instruction that causes a traveling vehicle V to receive or deliver an article M from or to a predetermined position (a pickup instruction that causes the traveling vehicle V to pick up an article M arranged at a predetermined location, or an unloading instruction that causes the traveling vehicle V to unload the held article M to a predetermined location). The transport instruction CM1 includes information on a transfer position Pt indicating a position to which the traveling vehicle V is to transfer an article M. The transfer position Pt is the position of each traveling vehicle V or the position of each part (such as the placement part for an article M in a processing apparatus, storage device, load port, or buffer) related to the traveling vehicle system SYS, and is represented using a coordinate value, for example. The system information includes state information of each transport vehicle V, map information showing the location of each part (such as processing apparatus, storage apparatus, or buffer) related to the traveling vehicle system SYS, and position information of an article M. The host controller HC updates the system information by communicating with each of the traveling vehicles V (V1 to Vn) and the blocking controller BC.

For example, as shown in FIG. 6, as a transport instruction CM1, the host controller HC transmits to the traveling vehicle V an instruction to travel along the traveling route from the grid cell C42 to the grid cell C49 indicated by the two-dot chain line and to transfer an article M to a predetermined position provided below the grid cell C49.

The transport instruction CM1 is an instruction that causes a traveling vehicle V to execute a traveling operation to travel until stopping at a predetermined stop position immediately before performing the transfer operation to transfer an article M to a transfer destination, and then, causes the traveling vehicle V to move from the stop position to a position for executing transfer, and execute the transfer operation to transfer the article M to the predetermined position. The stop position mentioned above is defined at a grid cell C adjacent to the grid cell C where the transfer operation is executed. For example, in the transport instruction CM1 shown in FIG. 6, the grid cell C48 adjacent to the grid cell C49 serving as the transfer destination, is defined as the stop position for the traveling vehicle V, and the traveling vehicle V executes a traveling operation to travel from the grid cell C42 to the grid cell C48 and stop there. Then, the traveling vehicle V moves from the grid cell C48 to the predetermined position in the grid cell C49 where the transfer operation is to be executed, and executes the transfer operation. The predetermined stop position mentioned above may be set in the blocking section B for executing the transfer operation. In such an example of the transport instruction CM1 shown in FIG. 6, the grid cell C49 where the transfer destination is to be executed is defined as the stop position for the traveling vehicle V, and the traveling vehicle V executes a traveling operation to travel from the grid cell C42 to the grid cell C49 and stop there. Then, the traveling vehicle V moves to the predetermined position in the grid cell C49 where the transfer operation is to be executed, and executes the transfer operation. In a configuration in which the above predetermined stop position is a blocking section B that executes the transfer operation or a blocking section adjacent to the blocking section B that executes the transfer operation, it is possible to cause the traveling vehicle V to travel to the position to execute the transfer operation or a position close to the position to execute the transfer operation, and it is therefore possible to reduce the number of blocking sections B to be occupied for the transfer operation.

The traveling vehicle V stores instructions from the host controller HC such as the received transport instruction CM1 in the memory storage 51 as instruction information T3. Upon receiving the transport instruction CM1, the traveling vehicle V makes a request to the blocking controller BC for an occupation permission regarding a plurality of the blocking sections B to be occupied by the traveling vehicle V itself and are designated by the transport instruction CM1. The occupation requester 56 generates an occupation request (occupation permission request) that requests the blocking controller BC for an occupation permission regarding the blocking sections B (Step S2 of FIG. 5).

The occupation requester 56 makes a request to the blocking controller BC for an occupation permission regarding the blocking sections B to be occupied for the traveling vehicle V to execute operations, where in a series of operations to be executed by the traveling vehicle V of its own (abbreviated as "own traveling vehicle"), the operation of the own traveling vehicle from the start of traveling to stopping before executing a predetermined operation included in the series of operations is demarcated. In such a configuration, compared to a configuration of executing exclusive control at once for blocking sections B to travel until stopping at a position of performing a predetermined operation as well as blocking sections B to travel after performing the predetermined operation, it is possible to reduce the number of blocking sections B to be temporarily occupied. Moreover, in such a configuration, the traveling vehicle V side transmits occupation permission requests split according to the demarcation mentioned above, it is therefore possible to distribute the load, compared to a configuration in which the controller side splits an occupation request according to the above demarcation. The predetermined operation mentioned above is not particularly limited. Examples of the predetermined operation mentioned above include a transfer operation (pickup operation, unloading operation), a direction change operation, and a charging operation. The predetermined operation mentioned above requires more time than a traveling operation. The target grid cell C of operation execution of the predetermined operation mentioned above (such as transfer, direction change, or charging) is fixed, however, as for an operation of traveling, it is possible to change the grid cell C to execute the traveling operation, that is to say, another route can be selected. While the grid cell C of the starting point and the grid cell C of the end point can be specified for a traveling operation, the starting point and the end point cannot be specified for the predetermined operation mentioned above. Therefore, in the configuration of the occupation requester 56 mentioned above, the occupation permission is requested as split occupation permissions, namely an occupation permission regarding the blocking sections B required until stopping before executing a predetermined operation, at which point a route change is still possible, and an occupation permission regarding the blocking sections B in which the position to execute an operation is fixed and the operation requires some time. Therefore, compared to a configuration of executing exclusive control at once for blocking sections B to travel until stopping at a position to perform a predetermined operation as well as blocking sections B to travel after performing the predetermined operation, it is possible to effectively suppress hindrance to traveling of the traveling vehicle V caused by occupation of the blocking sections B required for the series of operations mentioned above.

A specific example of the operation of the occupation requester 56 will now be described. In the transport instruction CM1 shown in FIG. 6, the demarcated operation up to stopping immediately before executing the predetermined operation (transfer operation) is the operation of traveling until stopping at the predetermined stop position (grid cell C48). In the transport instruction CM1 shown in FIG. 6, the occupation requester 56 makes requests to the blocking controller BC by generating, as separate requests, a traveling occupation request RQ1 (first occupation permission request) that is an occupation request regarding the blocking sections B to be occupied to execute the traveling operation, and a transfer occupation request RQ2 (second occupation permission request) that is an occupation request regarding the blocking section B to be occupied to execute a transfer operation. At this time, the traveling vehicle V transmits the traveling occupation request RQ1 to the blocking controller BC, and then transmits the transfer occupation request RQ2 to the blocking controller BC. In the configuration in which requests are made to the blocking controller BC by generating, as separate requests, a traveling occupation request RQ1 (first occupation permission request) and a transfer occupation request RQ2 (second occupation permission request), compared to a configuration of executing exclusive control at once for blocking sections B to travel until stopping at a predetermined stop position as well as a blocking section B to execute a transfer operation, it is possible to reduce the number of blocking sections B to be temporarily occupied. In such a configuration, the traveling vehicle V transmits the first and second occupation permission requests, and it is therefore possible to distribute the load on the controller.

FIG. 7 is a diagram showing an example of the traveling occupation request RQ1. The traveling occupation request RQ1 includes traveling vehicle information D1, requested sections D2, request type D3, operation D4, and time D5. The traveling vehicle information D1 is identification information of the traveling vehicle V. The requested sections D2 is information indicating blocking sections B for which an occupation permission is requested. For example, when indicating a plurality of consecutive blocking sections B, the requested sections D2 is represented by the blocking section B located at both ends of the consecutive sections, and is represented to indicate the order of the blocking sections B to be occupied first and thereafter by the traveling vehicle V. In such a configuration, the amount of data can be reduced compared to a configuration in which a plurality of consecutive blocking sections B are indicated one by one. The request type D3 is information indicating the type of request regarding blocking sections B, and is information indicating that it is an occupation request. The operation D4 is information indicating the type of operation to be performed at the blocking sections B for which the occupation permission is requested, and is information indicating the traveling operation in the traveling occupation request RQ1. The time D5 is a time at which generation of the occupation request is completed.

The occupation requester 56 generates an occupation request that makes a request to the controller regarding a plurality of consecutive blocking sections B, collectively as one set of information through one communication session. In such a configuration, the number of communication sessions performed between the blocking controller BC and the traveling vehicle V can be reduced in comparison to a configuration that requires an individual transmission of an occupation request for each blocking section B. The number of the plurality of consecutive blocking sections B mentioned above is determined on the basis of one or both of the speed of the traveling vehicle V and the cycle of communication performed between the traveling vehicle V and the blocking controller BC. The number of the plurality of consecutive blocking sections B mentioned above is set with the upper limit thereof being the number of blocking sections B through which the traveling vehicle V is allowed to travel during one cycle of communication between the traveling vehicle V and the blocking controller BC. In other words, the number of the plurality of consecutive blocking sections B for which the traveling vehicle V requests the blocking controller BC for an occupation permission is set so that the traveling vehicle V does not request the blocking controller BC for an occupation permission for blocking sections B at positions where the traveling vehicle V cannot be traveling during one cycle of communication between the traveling vehicle V and the blocking controller BC. In a configuration where, as mentioned above, the number of the plurality of consecutive blocking sections B is determined on the basis of one or both of the speed of the traveling vehicle V and the cycle of communication performed between the traveling vehicle V and the blocking controller BC, it is possible to suppress an occupation permission from being granted to the traveling vehicle V to blocking sections B arranged at positions where the traveling vehicle V cannot be traveling when the speed or the communication cycle of the traveling vehicle V is taken into consideration. The number of the plurality of consecutive blocking sections B mentioned above is set with the upper limit thereof being the number of blocking sections B when the speed or the communication cycle of the traveling vehicle V is taken into consideration. The cycle of communication is T1 shown in FIG. 20 described later. The occupation requester 56 is not limited to the configuration of generating an occupation request that has been aggregated into one set of information regarding a plurality of consecutive blocking sections B. For example, when the number of blocking sections B to be occupied defined in the transport instruction CM1 is one, the occupation requester 56 transmits to the blocking controller BC an occupation request RQA in which the number of blocking sections B to be occupied is one. Also, for example, the occupation requester 56 may transmits to the blocking controller BC an occupation request RQA that includes one blocking section B to be occupied.

For example, a traveling occupation request RQ1 related to the transport instruction CM1 shown in FIG. 6 is represented as follows. Traveling vehicle information D1: V, requested sections D2: B42 to B48, request type D3: occupation, operation D4: traveling (see FIG. 7). The traveling occupation request RQ1 is not limited to the above example, and may be composed of information other than the information mentioned above.

FIGS. 8(A) to (C) are diagrams showing examples of transfer occupation requests RQ2. As with a traveling occupation request RQ1, a transfer occupation request RQ2 includes traveling vehicle information D1, requested sections D2, request type D3, operation D4, and time D5. In a transfer occupation request RQ2, the operation D4 is information indicating a transfer operation.

When a traveling vehicle V executes a transfer operation, the vehicle body of the traveling vehicle V and the lateral extender 11 may straddle across the region of a plurality of grid cells C as seen in a plan view, depending on the transfer position of an article M. In such a configuration, it is necessary to occupy a plurality of blocking sections B corresponding to the plurality of grid cells C so that interference with another traveling vehicle V would not occur. For example, in the example of the transfer operation shown in FIG. 6, the blocking sections B required to be occupied for executing the transfer operation may be B49, may be B49 and B50, and may be B49, B50, B59, and B60. The blocking sections B required to be occupied to execute the transfer operation is found by the occupation requester 56 on the basis of information on the transfer position of the article M included in the transport instruction CM1. When the blocking section B required to be occupied to execute the transfer operation is B49, the transfer occupation request RQ2 regarding the transfer operation is represented as follows. Traveling vehicle information D1: V, requested sections D2: B49, request type D3: occupation, operation D4: transfer (see FIG. 8(A)). When the blocking sections B required to be occupied to execute the transfer operation are B49 and B50, the transfer occupation request RQ2 is represented as follows. Requested sections D2: B49, B50 (see FIG. 8(B)). When the blocking sections B required to be occupied to execute the transfer operation are B49, B50, B59, and B60, the transfer occupation request RQ2 is represented as follows. Requested sections D2: B49, B50, B59, B60 (see FIG. 8(C)). The transfer occupation request RQ2 is not limited to the above example, and may be composed of information other than the information mentioned above.

Figure 9:
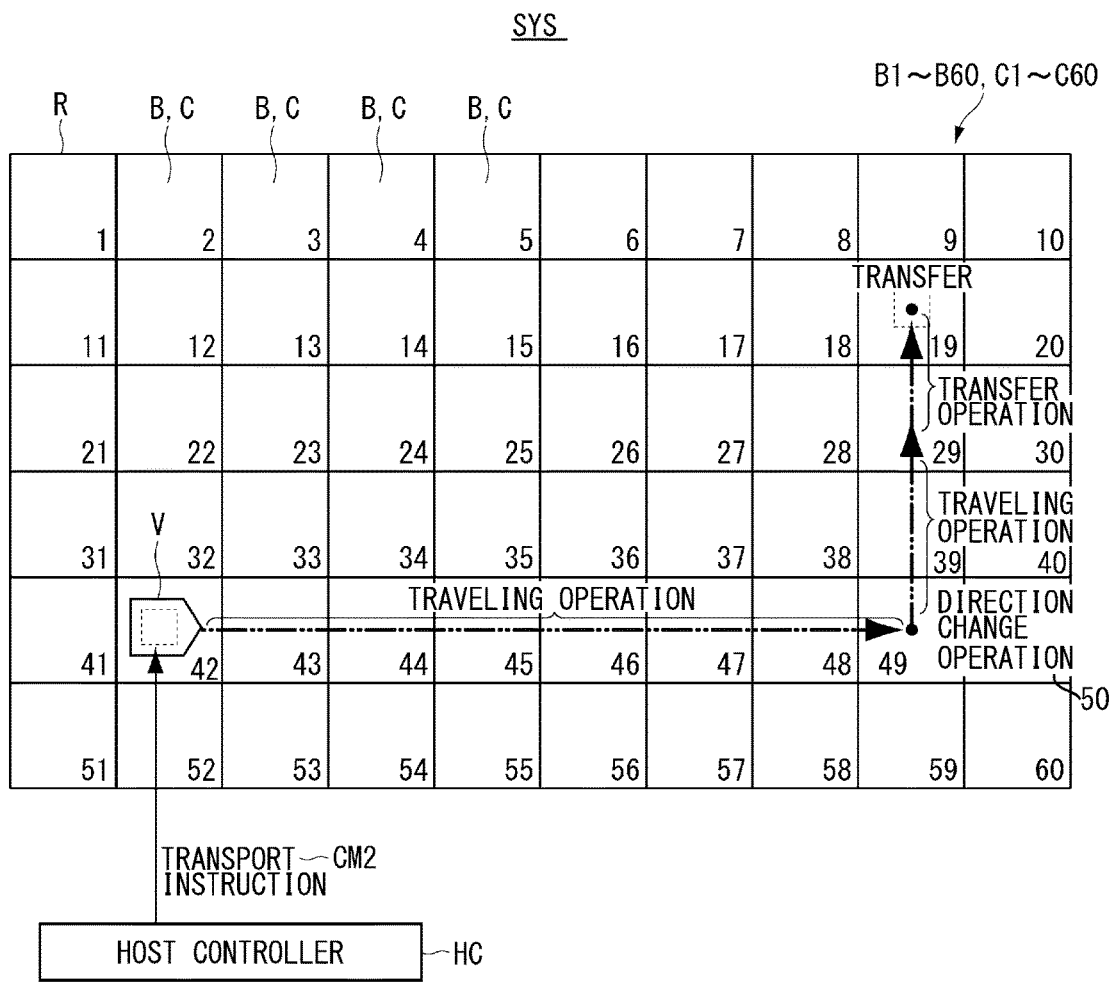
FIG. 9 is a diagram showing an example of the transfer-related control of the traveling vehicle V performed by the traveling vehicle system.

FIG. 9 is a diagram showing an example of the transfer-related control of the traveling vehicle V performed by the traveling vehicle system SYS. FIG. 9 shows an example of when, as a transport instruction CM2, the host controller HC transmits to the traveling vehicle V an instruction to travel along the traveling route from the grid cell C42 to the grid cell C19 indicated by the two-dot chain line and transfer an article M to a predetermined position provided below the grid cell C19.

The transport instruction CM2 shown in FIG. 9 is an instruction that causes the traveling vehicle V to travel from the grid cell C42 to the grid cell C49, change the direction thereof to the grid cell C39 direction, at the grid cell C49, travel from the grid cell C49 to the grid cell C29, move from the grid cell C29 to the predetermined position for executing transfer in the grid cell C19, and execute the transfer.

In the transport instruction CM2 shown in FIG. 9, the predetermined operations executed by the traveling vehicle V are a direction change operation and a transfer operation. The demarcated operations up to stopping before executing the direction change operation are the traveling operation from the grid cell C42 to the grid cell C49 and the direction change operation. The demarcated operation up to stopping before executing the transfer operation is the operation of traveling until stopping at the predetermined position (C29) mentioned above.

The occupation requester 56 detects a predetermined operation (direction change operation, transfer operation, charging operation) related to the transport instruction CM2, and generates an occupation request on the basis of the detection result. When there are a plurality of the predetermined operations, the occupation requester 56 generates an occupation request for each of the predetermined operations, with the operation up to stopping before executing the operation is demarcated.

The occupation requester 56 transmits to the blocking controller BC, as separate requests, an occupation request (third occupation permission request) regarding the blocking sections B to be occupied for traveling until stopping at the position for performing a direction change, and an occupation request (fourth occupation permission request) regarding the blocking sections B to be occupied for traveling after performing the direction change. At this time, the traveling vehicle V transmits the third occupation permission request to the blocking controller BC, and then transmits the fourth occupation permission request to the blocking controller BC. When the traveling vehicle V transmits to the blocking controller BC, as separate requests, an occupation request (third occupation permission request) regarding the blocking sections B to be occupied for the traveling vehicle V to travel until stopping at the position for performing a direction change, and an occupation request (fourth occupation permission request) regarding the blocking sections B to be occupied for traveling after performing the direction change, compared to a configuration of executing exclusive control at once for blocking sections B to travel until stopping at a position to perform a direction change as well as blocking sections B to travel after performing the direction change, it is possible to reduce the number of blocking sections B to be temporarily occupied. In such a configuration, the traveling vehicle V transmits the third and fourth occupation permission requests, and it is therefore possible to distribute the load on the controller.

In the transport instruction CM2 shown in FIG. 9, the occupation requester 56 makes requests to the blocking controller BC by generating, as separate requests, a traveling occupation request RQ3 (third occupation permission request) that is an occupation request regarding the blocking sections B to be occupied to execute the traveling operation before executing the direction change, a traveling occupation request RQ4 (first occupation permission request, fourth occupation permission request) that is an occupation request regarding the blocking sections B to be occupied to execute the traveling operation before executing the transfer operation, and a transfer occupation request RQ5 (second occupation permission request) that is an occupation request regarding the blocking section B to be occupied to execute the transfer operation.

FIG. 10 is a diagram showing examples of occupation requests. For example, in the transport instruction CM2 shown in FIG. 9, the traveling occupation request RQ3 is represented as follows. Traveling vehicle information D1: V, requested sections D2: B42 to B49, request type D3: occupation, operation D4: traveling, direction change. The traveling occupation request RQ4 is represented as follows. Traveling vehicle information D1: V, requested sections D2: B39 to B29, request type D3: occupation, operation D4: traveling. The transfer occupation request RQ5 is expressed as traveling vehicle information D1: V, request type D3: occupation, operation D4: transfer, and the requested sections D2 is an occupation request regarding the blocking section B that is required to be occupied for executing the transfer operation as described above.

Figure 11:
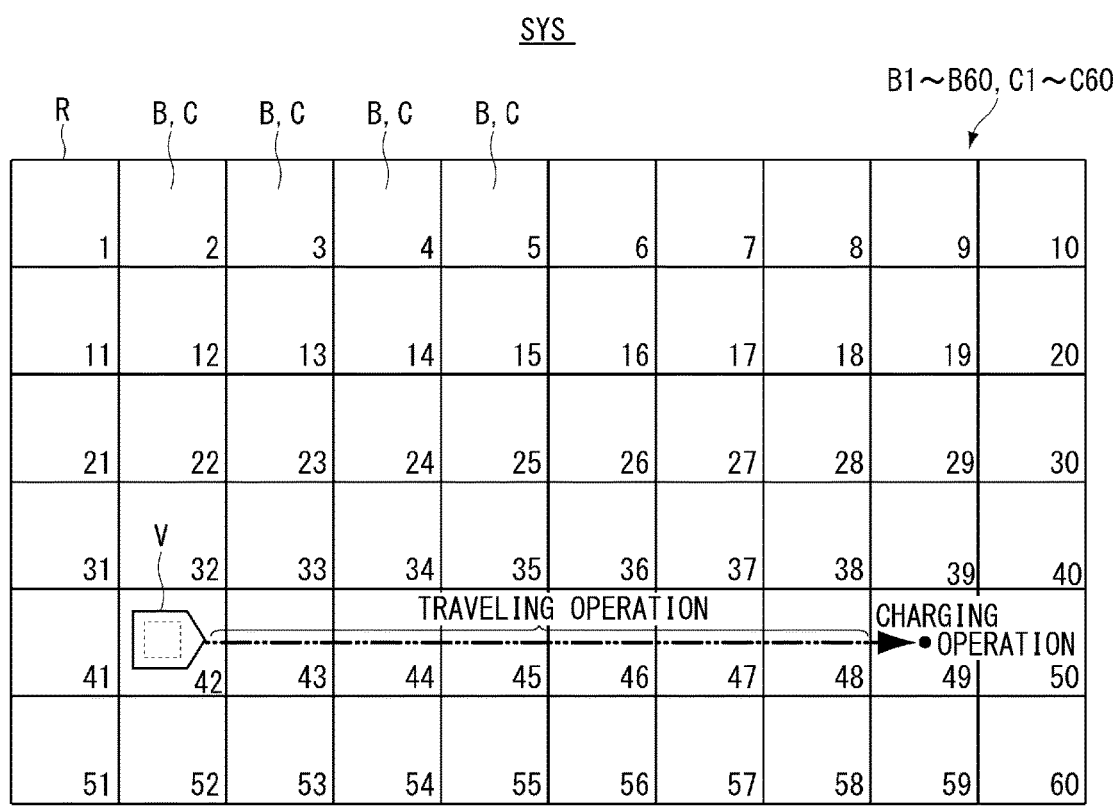
FIG. 11 is a diagram showing an example of an operation at time of charging the traveling vehicle.

FIG. 11 is a diagram showing an example of an operation at time of charging the traveling vehicle V. FIG. 12 is a diagram showing examples of charging-related occupation requests. In the example of FIG. 11, it is assumed that the charging terminal 40 (see FIG. 1) is arranged in the grid cell C49, the traveling vehicle V travels from the grid cell C42 to the grid cell C49 and charges in the grid cell C49, and after charging is completed, the traveling vehicle V is scheduled to travel from the grid cell C49 to the grid cell C19.

There are examples where the traveling vehicle V performs charging. When performing charging, the traveling vehicle V makes a request to the blocking controller BC for permission to occupy blocking sections B required for the charging operation. The occupation requester 56 generates and transmits to the blocking controller BC, as separate requests, an occupation request RQA (fifth occupation permission request) regarding the blocking sections B to be occupied for traveling until stopping at the position to perform charging, and an occupation request RQA (sixth occupation permission request) regarding the blocking sections B to be occupied to travel after performing the charging. At this time, the traveling vehicle V transmits the fifth occupation permission request to the blocking controller BC, and then transmits the sixth occupation permission request to the blocking controller BC. In generating and transmitting to the blocking controller BC, as separate requests, an occupation request RQA (fifth occupation permission request) regarding the blocking sections B to be occupied for the traveling vehicle V to travel until stopping at the position for performing charging, and an occupation request RQA (sixth occupation permission request) regarding the blocking sections B to be occupied to travel after performing the charging, compared to a configuration of executing exclusive control at once for blocking sections B to travel until stopping at a position to perform charging as well as blocking sections B to travel after performing the charging, it is possible to reduce the number of blocking sections B to be temporarily occupied. In such a configuration, the traveling vehicle V transmits the fifth and sixth occupation permission requests, and it is therefore possible to distribute the load on the controller.

In the example shown in FIG. 11, the occupation requester 56 makes requests to the blocking controller BC by generating, as separate requests, a traveling occupation request RQ6 (fifth occupation permission request) that is an occupation request regarding the blocking sections B to be occupied to execute the traveling operation before executing the charging operation, and a traveling occupation request RQ7 (sixth occupation permission request) that is an occupation request RQA regarding the blocking sections B to be occupied to execute the traveling operation after the charging operation. In the charging operation, the predetermined operation mentioned above is a charging operation, and the demarcated operation up to stopping before executing the predetermined operation mentioned above is the traveling operation to the grid cell C where charging can be performed.

For example, in the example shown in FIG. 11, the traveling occupation request RQ6 is represented as follows. Traveling vehicle information D1: V, requested sections D2: B42 to B49, request type D3: occupation, operation D4: traveling, charging (see FIG. 12). The traveling occupation request RQ7 is represented as follows. Traveling vehicle information D1: V, requested sections D2: B39 to B19, request type D3: occupation, operation D4: traveling.

As described above, the occupation requester 56 separately generates an occupation permission regarding the blocking sections B to be occupied for the traveling vehicle V to execute operations, where the operation of the own traveling vehicle from the start of traveling to stopping before executing a predetermined operation included in the series of operations is demarcated.

The above occupation request RQA separately generated by the occupation requester 56 is transmitted to the blocking controller BC by the communicator 52 in Step S4 of FIG. 5. The occupation request RQA is transmitted to the blocking controller BC through cyclic communication. Step S4 is executed as a response to a transmission request from the blocking controller BC. Cyclic communication will be described later.

The timing of transmitting the occupation requests RQA described above is such that after transmitting the occupation request RQA related to a traveling occupation request in which the operation from the start of traveling of the traveling vehicle V up to stopping before executing the predetermined operation included in the series of operations is demarcated, the occupation request RQA (transfer occupation request, turning occupation request, charging occupation request) related to the blocking sections B required to execute the predetermined operation is transmitted. In such a configuration, the occupation request RQA related to a traveling occupation request and the occupation request RQA related to execution of a predetermined operation are transmitted separately on each traveling vehicle V side. Therefore, compared to a configuration in which the above processing for each traveling vehicle V is performed on the controller side, it is possible to reduce the load on the controller.

After having completed an operation in a blocking section B for which an occupation permission has been granted, the traveling vehicle V requests the blocking controller BC to release the occupation permission regarding the blocking sections B, for which the occupation permission has been granted. The above operation completion is, for example, a departure from the blocking section B. For example, when the traveling vehicle V performs a direction change operation or a charging operation, the above operation completion occurs when the traveling vehicle V departs from the blocking section B after the direction change operation or the charging operation is completed by the traveling vehicle V. A departure from the blocking section B can be detected in the traveling vehicle V on the basis of the map information T2 and the current position information. The above operation completion is detected for each blocking section B in which an operation has been completed, among the plurality of blocking sections B for which an occupation permission is granted. A request to release an occupation permission is made by the release requester 57 generating a release request RQB that requests the releasing of the occupation permission (Step S11) and by transmitting the release request RQB to the blocking controller BC (Step S13). The release request RQB is information that is sent to the blocking controller BC collectively as one set of information through one communication session to request release of the occupation permission regarding one or more blocking sections B for which the occupation permission has been granted. Upon detecting a blocking section B in which an operation is completed, the release requester 57 generates a release request RQB that requests release of the occupation permission for the blocking section B, in which the operation is completed. The release requester 57 performs detection of operation completion for every single blocking section B, and generates a release request RQB regarding the blocking section B in which the operation is completed. The release requester 57 generates a release request RQB regarding a blocking section B in which an operation is completed, at every communication cycle. The release request RQB is represented by replacing "occupation permission request" of the request type D3 in the above occupation request RQA with "release request."

Figure 13:
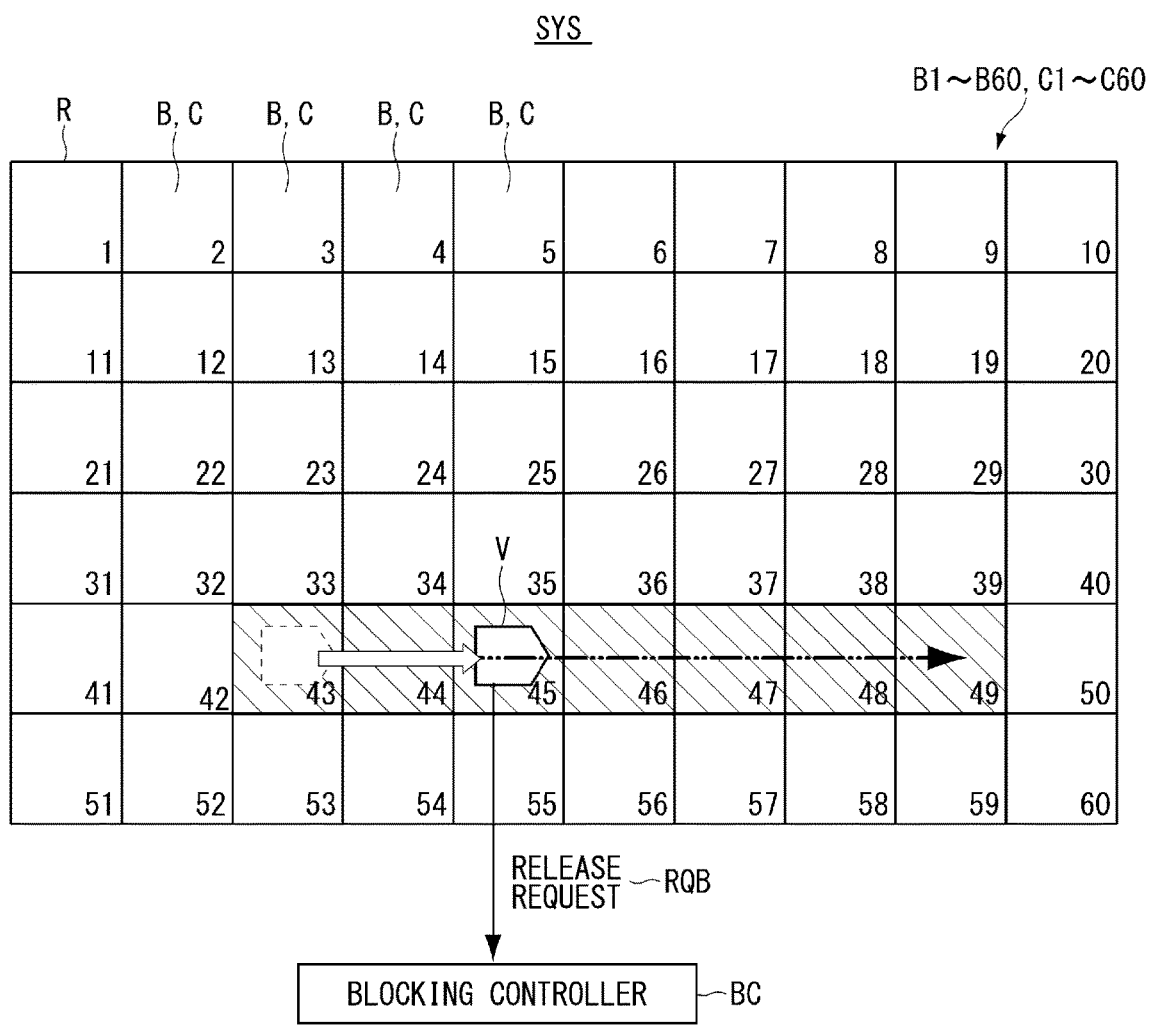
FIG. 13 is a diagram showing an example of an operation related to a release request in the traveling vehicle system.

FIG. 13 is a diagram showing an example of an operation related to a release request RQB in the traveling vehicle system SYS. FIG. 13 shows a state where, after an occupation permission for the blocking sections B43 to B49 has been granted to the traveling vehicle V, the traveling vehicle V has traveled from the blocking section B43 to the blocking section B45.

In the example shown in FIG. 13, the release requester 57 generates a release request RQB that requests to release the occupation permission for the blocking sections B43 to B44, in which an operation is completed, of the blocking sections B43 to B49 for which the occupation permission has been granted. At this time, the release requester 57 detects the blocking section B43, in which an operation is completed, and generates a release request that requests release of the occupation permission for the blocking section B43. Subsequently, the release requester 57 detects the blocking section B44, in which an operation is completed, and generates a release request RQB that is aggregated as one set of information requesting the blocking controller BC through one session of communication, regarding the blocking sections B43 to B44, for which release of the occupation permission is requested. Such a release request RQB is represented as follows. Traveling vehicle information D1: V, requested sections D2: B43 to B44, request type D3: occupation release request, operation D4: traveling, time D5: time of generating release request RQB. As described above, in a configuration where the traveling vehicle V sends a request to the blocking controller BC, collectively as one set of information through one communication session, release of the occupation permission regarding one or more blocking sections B for which the occupation permission has been granted, the number of communication sessions performed between the blocking controller BC and the traveling vehicle V can be reduced in comparison to a configuration that requires an individual transmission of a release request RQB for each blocking section B. Also, in a configuration where detection of operation completion is performed for every single blocking section B as mentioned above and a release request RQB is generated for the blocking section B in which the operation is completed, the occupation permission for a blocking section B granted to the traveling vehicle V is promptly released, and therefore, another traveling vehicle V can promptly obtain an occupation permission for the blocking section B.

The release request RQB generated by the release requester 57 is transmitted by the communicator 52 to the blocking controller BC through one communication session in Step S13 of FIG. 5. The release request RQB is transmitted, by cyclic communication described later, to the blocking controller BC as a response to the transmission request from the blocking controller BC (Step S12). When an occupation request RQA and a release request RQB to be transmitted to the blocking controller BC are both present, these may be aggregated into one set of information and transmitted through one communication session.

Next, the blocking controller BC will be described. The blocking controller BC determines whether or not to grant an occupation permission for one or more blocking sections B for which the occupation permission is requested by a traveling vehicle V, and grants the traveling vehicle V the occupation permission for the one or more blocking sections B that are determined to be able to allow the permission.

The blocking controller BC includes a memory storage 61 that memorizes (stores) various data, a communicator 62, an occupation request processor 63, an occupation request determiner 64, a release request processor 65, a release request determiner 66, and a responder 67 (see FIG. 4). The blocking controller BC is a computer. The memory storage 61 memorizes (stores), for example, request management information T4 and occupation management information T5.

The communicator 62 communicates with external devices. The communicator 62 is wirelessly connected to a communication system. The communicator 62 communicates with the plurality of traveling vehicles V and the host controller HC via the communication system.

The occupation request processor 63 performs processing related to an occupation request RQA. Every time an occupation request RQA is received from the traveling vehicle V, the occupation request processor 63 records (adds) the occupation request RQA in the request management information T4. Every time a determination is made for an occupation request RQA, the occupation request processor 63 records (adds) the determination result in the request management information T4.

The release request processor 65 performs processing related to a release request RQB. Every time a release request RQB is received, the release request processor 65 records (adds) the release request RQB in the request management information T4. Every time a determination is made for a release request RQB, the release request processor 65 records (adds) the determination result in the request management information T4.

FIG. 14 is a diagram showing an example of the request management information T4. The request management information T4 is information for managing occupation requests RQA and release requests RQB. The request management information T4 is table data in which received occupation requests RQA or release requests RQB are associated with information regarding the determination (response) for the occupation requests RQA or release requests RQB. The request management information T4 includes, for example, traveling vehicle information D1, requested sections D2, request type D3, operation D4, time D5, sections D6, response type D7, operation D8, and time D9. The traveling vehicle information D1, the requested sections D2, the request type D3, the operation D4, and the time D5 are information all related to occupation requests RQA or release requests RQB described above.

The sections D6, the response type D7, the operation D8, and the time D9 are information all related to the contents of determination (response) for occupation requests RQA or release requests RQB. For example, the sections D6, the response type D7, and the operation D8 are information indicating the result of the blocking controller BC granting or not granting a permission for the requested sections D2, the request type D3, and the operation D4, respectively. The time D9 is information indicating the time at which the blocking controller BC grants an occupation permission or release permission. The request management information T4 is not limited to the above example, and may be composed of information other than the information mentioned above.

The blocking controller BC executes exclusive control for occupation requests RQA on the basis of predetermined rules (exclusive control rules) set in advance. An example of the exclusive control rules will be described below. The following exclusive control rules are merely an example and may be of other configurations.

As an exclusive control rule, after executing exclusive control regarding a traveling occupation request in which the operation from the start of traveling of the traveling vehicle V up to stopping before executing a predetermined operation included in a series of operations is demarcated, the blocking controller BC executes exclusive control regarding an occupation permission related to a blocking section B required to execute the predetermined operation (transfer occupation permission, turning occupation permission, charging occupation permission).

As an exclusive control rule, after executing exclusive control regarding the blocking sections B to be occupied for the traveling vehicle V, in a series of operations to be executed by the traveling vehicle V, to travel until stopping at a predetermined stop position immediately before performing a transfer operation to transfer an article M to a transfer destination (traveling occupation request, first occupation permission request), the blocking controller BC executes exclusive control regarding the blocking section B to be occupied for the transfer operation of the traveling vehicle V (transfer occupation request, second occupation permission request). In such a configuration, compared to a configuration of executing exclusive control at once to block sections B for traveling until stopping at a predetermined stop position as well as a blocking section B to execute a transfer operation, it is possible to reduce the number of blocking sections B to be temporarily occupied.

As an exclusive control rule, after executing exclusive control regarding the blocking sections B to be occupied for the traveling vehicle V, in a series of operations to be executed by the traveling vehicle V, to travel until stopping at a position to perform a direction change (traveling occupation request, third occupation permission request), the blocking controller BC executes exclusive control regarding the blocking sections B to be occupied for the traveling vehicle V to travel after performing the direction change (traveling occupation request, fourth occupation permission request). In such a configuration, compared to a configuration of executing exclusive control at once for blocking sections B to travel until stopping at a position to perform a direction change as well as blocking sections B to travel after performing the direction change, it is possible to reduce the number of blocking sections B to be temporarily occupied.

As an exclusive control rule, after executing exclusive control regarding the blocking sections B to be occupied for the traveling vehicle V, in a series of operations to be executed by the traveling vehicle V, to travel until stopping at a position for performing charging (traveling occupation request, fifth occupation permission request), the blocking controller BC executes exclusive control regarding the blocking sections B to be occupied for the traveling vehicle V to travel after performing the charging (traveling occupation request, fifth occupation permission request). In such a configuration, compared to a configuration of executing exclusive control at once for blocking sections B to travel until stopping at a position for performing charging as well as blocking sections B to travel after performing the charging, it is possible to reduce the number of blocking sections B to be temporarily occupied.

Exclusive control regarding an occupation request RQA by the blocking controller BC is performed upon a determination to permit the occupation request RQA.

Figure 15:
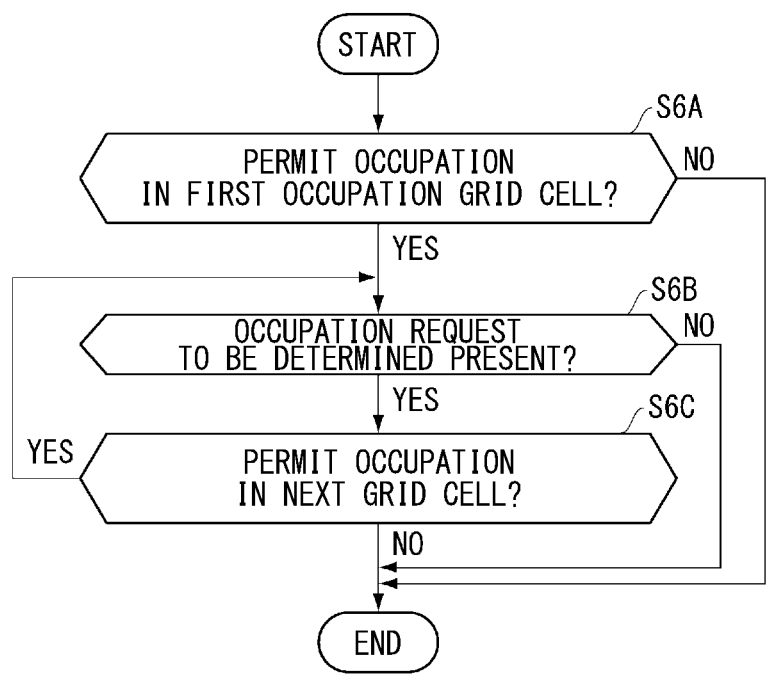
FIG. 15 is a flowchart showing an example of an occupation request determination related to a traveling operation.

An example of a determination of an occupation request RQA related to traveling will now be described. FIG. 15 is a flowchart showing an example of the occupation request determination related to traveling.

The occupation request determiner 64 determines whether or not to permit an occupation request RQA (Step S6 of FIG. 5). The occupation request determiner 64 determines occupation requests RQA according to predetermined rules (determination rules) set in advance. Examples of the determination rules will be described below. The following determination rules are merely an example and may be of other configurations.

A determination rule is a rule such that if an occupation permission is granted to another traveling vehicle V for a determination target blocking section B, it is determined not to grant an occupation permission for the determination target blocking section B, and if an occupation permission is not granted to another traveling vehicle V for a determination target blocking section B, it is determined to grant an occupation permission for the determination target blocking section B.

A determination rule is a rule such that if an occupation permission for a blocking section B is requested from a plurality of traveling vehicles V, it is determined to grant an occupation permission for the blocking section B to the traveling vehicle V that requested the occupation permission first, and it is determined not to grant an occupation permission for the blocking section B to the traveling vehicles V that requested the occupation permission thereafter. With this configuration, it is possible to prevent traveling of the traveling vehicle V that requested an occupation permission first from being hindered by a traveling vehicle V that requested an occupation permission later.

Also, a determination rule is set on the basis of the exclusive control rules described above. This type of determination rule is such that, for example, after granting permission regarding a traveling occupation request in which the operation from the start of traveling of the traveling vehicle V up to stopping before executing a predetermined operation included in a series of operations is demarcated, a permission is granted regarding an occupation permission related to a blocking section B required to execute the predetermined operation (transfer occupation permission, turning occupation permission, charging occupation permission).

The occupation request determiner 64 determines, among the plurality of blocking sections B for which the traveling vehicle V makes a request for an occupation permission through an occupation request RQA, one or more of the blocking sections B that are able to allow a permission consecutively from an end thereof to be primarily occupied (the side closer to the operation starting point), on the basis of the traveling direction of the traveling vehicle V (Step S6A to Step S6C in FIG. 15). In such a configuration, one or more of the blocking sections B that are permissible are determined, and therefore, an occupation permission for the appropriate blocking section B can be promptly granted to the traveling vehicle V compared to a configuration in which no occupation permission will be granted unless a permission can be granted for all sections of the plurality of blocking sections B requested to the blocking controller BC.

In Step S6A of FIG. 15, the occupation request determiner 64 determines, on the basis of the above determination rules, whether or not to permit regarding the occupation request RQA for the blocking section B that the traveling vehicle V occupies first. The occupation request determiner 64 determines, on the basis of the request management information T4 and the occupation management information T5, whether or not to permit regarding the occupation request RQA for the target blocking section B. For example, when the traveling vehicle V makes an occupation request RQA regarding the blocking sections B42 to B48 as in the example of FIG. 7, the occupation request determiner 64 determines whether or not to permit regarding the occupation request RQA for the blocking section B42 to be occupied first.

FIG. 16 is a diagram showing an example of the occupation management information T5. The occupation management information T5 is information to manage the presence or absence of an occupation permission for blocking sections B. The occupation management information T5 is, for example, table data in which all blocking sections B within the traveling vehicle system SYS and the states of the occupation permission regarding the blocking sections B are associated.

The occupation management information T5 includes, for example, table data in which blocking sections D11, traveling vehicle information D12, operation D13, time D14, and controller setting D15, and these pieces of data are associated with each other. The blocking sections D11 is identification information of blocking sections B. The traveling vehicle information D12 and the operation D13 are identification information about the traveling vehicle V for which an occupation permission is granted in the target blocking section B, and information indicating the permitted operation, respectively. The time D14 is information indicating the time at which the blocking controller BC grants the occupation permission. The traveling vehicle information D12, the operation D13, and the time D14 are represented as empty data (NULL) when, for example, there is no traveling vehicles V for which an occupation permission is granted in the target blocking section B. The controller setting D15 indicates information related to the setting of blocking controller BC. For example, when a blocking section B is set as being unusable, the controller setting D15 indicates information to show that the blocking section B has been set as being unusable. If an occupation permission is requested regarding a blocking section B that has been set as being unusable in the controller setting D15, the occupation request determiner 64 determines not to grant the occupation permission. The occupation management information T5 is not limited to the above example, and may be composed of, for example, information other than the information mentioned above.

If the occupation request determiner 64 determines not to grant an occupation permission (Step S6A: NO), it is determined not to grant an occupation permission regarding the blocking section B to be occupied after the blocking section B that has been determined not to grant an occupation permission therefor, and the determination ends. Granting an occupation permission regarding the blocking section B for which an occupation permission has not been granted, will be re-performed later.

If the occupation request determiner 64 determines that an occupation permission is to be granted (Step S6A: YES), the occupation request determiner 64 determines whether or not there is an occupation request RQA to be determined (Step S6B).

If the occupation request determiner 64 determines that there is no occupation request RQA to be determined (Step S6B: NO), the determination ends. If the occupation request determiner 64 determines that there is an occupation request RQA to be determined (Step S6B: YES), then, in Step S6C, it is determined whether or not to grant an occupation permission regarding a blocking section B to be occupied after the blocking section B for which an occupation permission has been granted.

In Step S6C, the occupation request determiner 64 performs determination similar to that of Step S6A. If the occupation request determiner 64 determines to grant an occupation permission (Step S6C: YES), the process returns to Step S6B and the above processing is repeated. If the occupation request determiner 64 determines not to grant an occupation permission (Step S6C: NO), it is determined not to grant an occupation permission regarding the blocking section B to be occupied after the blocking section B that has been determined not to grant an occupation permission therefor, and the determination ends. Granting an occupation permission regarding the blocking section B for which an occupation permission has not been granted, will be re-performed later.

Through Step S6A to Step S6C, among the plurality of blocking sections B for which an occupation permission has been requested, one or more of the blocking sections B that are able to allow a permission consecutively from an end thereof to be primarily occupied on the basis of the traveling direction of the traveling vehicle V, are determined. The occupation request determiner 64 may not include the configuration of determining one or more of the blocking sections B that are able to allow a permission consecutively from an end thereof to be primarily occupied on the basis of the traveling direction of the traveling vehicle V. For example, the occupation request determiner 64 may determine the plurality of blocking sections B included in an occupation request RQA one by one.

Figure 18:
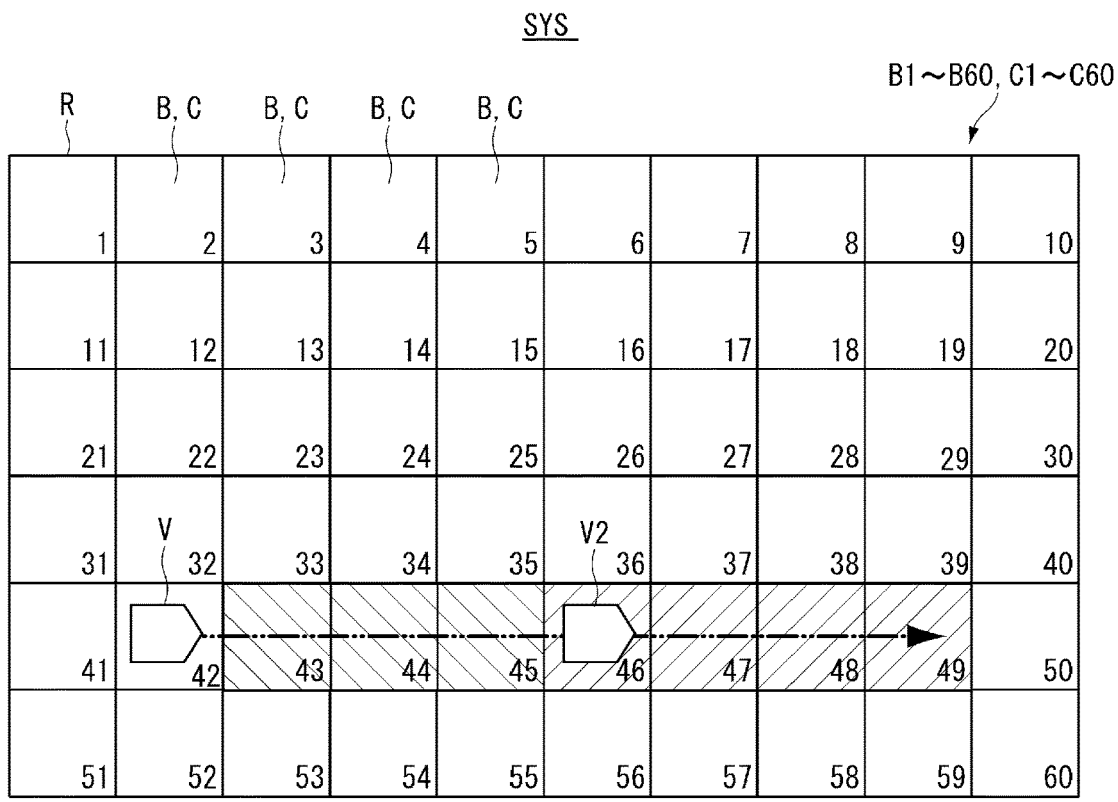
FIG. 18 is a diagram showing an example of a determination performed by an occupation request determiner.

FIGS. 17 and 18 are diagrams showing an example of the determination performed by the occupation request determiner 64. FIG. 17 shows an example of a state where the traveling vehicle V requests an occupation permission for the blocking sections B43 to B48, and no occupation permission is granted to another traveling vehicle V in the blocking sections B43 to B48. In the example shown in FIG. 17, in the occupation management information T5, the blocking sections B43 to B48 are NULL (empty data) indicating that occupation permission is not granted. In such an example, in Step S6A to Step S6C, the occupation request determiner 64 determines to grant an occupation permission to the traveling vehicle V for the blocking sections B43 to B48 on the basis of the occupation management information T5.

FIG. 18 shows an example of a state where the traveling vehicle V requests an occupation permission for the blocking sections B43 to B49, and an occupation permission is granted to the traveling vehicle V2 for the blocking sections B46 to B49. In the example shown in FIG. 18, data is recorded in the occupation management information T5, indicating that an occupation permission is granted to the traveling vehicle V2 for the blocking sections B46 to B49. On the other hand, the blocking sections B43 to B45 are NULL (empty data) indicating that occupation permission is not granted. In such an example, in Step S6A to Step S6C, the occupation request determiner 64 determines to grant an occupation permission to the traveling vehicle V for the blocking sections B43 to B45, and determines not to grant an occupation permission for the blocking sections B46 to B49.

When the determination in Step S6 of FIG. 5 is completed, in Step S7, the blocking controller BC updates the occupation management information T5 (traveling vehicle information D12, operation D13, time D14) regarding the blocking sections B for which an occupation permission is granted, on the basis of the determination result of Step S6. The occupation request processor 63 updates the occupation management information T5 regarding the blocking sections B for which the occupation permission is granted, on the basis of the determination result of Step S6.

When the determination in Step S6 of FIG. 5 ends, in Step S8, the responder 67 transmits to the traveling vehicle V, which transmitted an occupation request RQA or a release request RQB, the determination result of the occupation request RQA as response information T6.

FIG. 19 is a diagram showing an example of the response information T6. The response information T6 includes, for example, traveling vehicle information D1, sections D6, response type D7, operation D8, and time D9. The traveling vehicle information D1, the sections D6, the response type D7, the operation D8 and the time D9 are similar to the information included in the above request management information T4 shown in FIG. 14.

When the responding in Step S8 of FIG. 5 ends, in Step S9, the blocking controller BC updates the request management information T4 on the basis of the above determination result. The occupation request processor 63 records in (adds to) the request management information T4 the determination result (sections D6, response type D7, operation D8, time D9) for the occupation request RQA determined in Step S6.

Upon receiving the response information T6, the controller 50 of the traveling vehicle V updates the occupation permission information T1 stored in the memory storage 51, on the basis of the response information T6. The traveling vehicle V is allowed to move into the blocking section B for which an occupation permission is granted. In Step S11, the traveling vehicle V moves into the blocking section B for which an occupation permission is granted, and executes an operation on the basis of the transport instruction CM1.

After having completed the operation in the blocking section B for which occupation permission is granted, the traveling vehicle V generates a release request RQB that requests to release the occupation permission that has been granted for the blocking section B (Step S11 of FIG. 5). The traveling vehicle V generates the release request RQB as described above.

As a response to the transmission request from the blocking controller BC (Step S12 of FIG. 5), the traveling vehicle V transmits a release request RQB to the blocking controller BC through cyclic communication described later (Step S13).

When the blocking controller BC receives the release request RQB from the traveling vehicle V, the release request determiner 66 determines whether or not to release the occupation permission for the blocking sections B on the basis of the release request RQB, according to a predetermined criterion set in advance. (Step S14 of FIG. 5). The release request determiner 66 determines one or more of the blocking sections B the releasing of which can be permitted from an end thereof to be released first on the basis of the traveling direction of the traveling vehicle V.

For example, where it is confirmed, on the basis of the state information of the traveling vehicle V, that the traveling vehicle V has completed its operation in the blocking sections B, for which an occupation permission is granted, the release request determiner 66 determines to release the occupation permission regarding the blocking sections B and grants a release permission. If the above confirmation cannot be made, the release request determiner 66 determines not to release the occupation permission regarding the blocking sections B.

Based on the determination result of Step S14, the release request processor 65 updates the occupation management information T5 regarding the blocking sections B for which the release permission is granted (Step S15). The release request processor 65 updates the occupation management information T5 regarding the blocking sections B, for which the occupation permission is released, to NULL (empty data) indicating that occupation permission is not granted.

The release request processor 65 records (adds) the determination result (sections D6, response type D7, operation D8, time D9) for the release request RQB determined in Step S14 to the request management information T4 and updates it (Step S16).

When the determination in Step S14 of FIG. 5 ends, in Step S17, the responder 67 transmits to the traveling vehicle V, which transmitted the release request RQB, the determination result of the release request RQB as response information T6.

The traveling vehicle system SYS of this example controls the traveling vehicles V by repeating the operations of Step S1 to Step S17 of FIG. 5 for each traveling vehicle V in the system. The order of executing processes shown in Step S1 to Step S17 described above is merely an example, and can be realized in an arbitrary order unless an output of the previous processing is used in the following processing. Furthermore, some of the processes of Step S1 to Step S17 may be performed in parallel.

Figure 20:
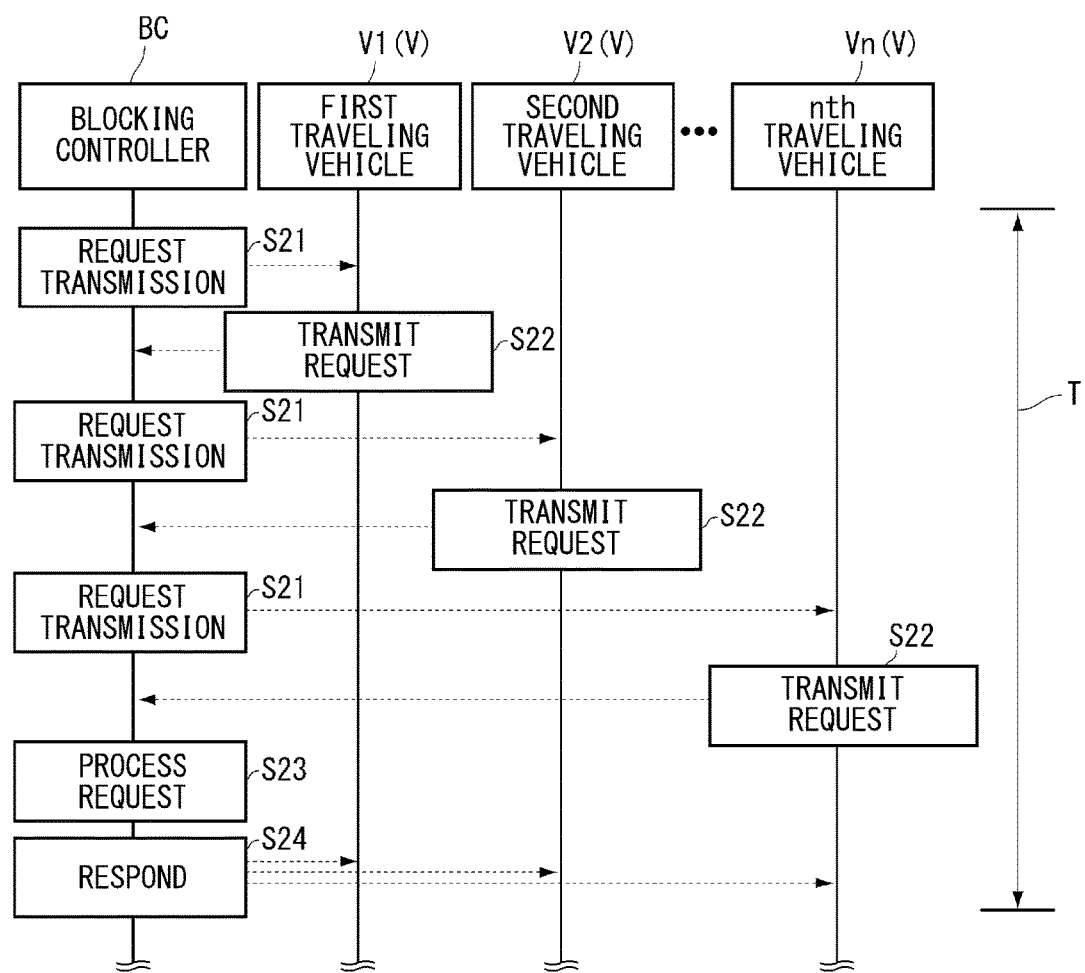
FIG. 20 is a diagram showing an example of an operation of the blocking controller.

FIG. 20 is a diagram showing an example of the operation of the blocking controller BC. The blocking controller BC performs the above processing (Step S3, Step S5 to Step S9, Step S14 to Step S17) using cyclic communication. The cyclic communication is, for example, polling communication.

In Step S21, the blocking controller BC transmits to the first traveling vehicle V1 a transmission request requesting a transmission of an occupation request RQA and a release request RQB to the blocking controller BC.

In Step S22, once the transmission request is received, the first traveling vehicle V1 transmits, as a response to the transmission request, the occupation request RQA and the release request RQB to the blocking controller BC. Step S22 is similar to Step S4 and Step S12 of FIG. 5.

Upon receiving the occupation request RQA and the release request RQB from the first traveling vehicle V1, in Step S21, the blocking controller BC transmits to the next second traveling vehicle V2 a transmission request requesting a transmission of the occupation request RQA and the release request RQB to the blocking controller BC.

The traveling vehicle system SYS repeats Step S21 and Step S22, and executes them sequentially for the first traveling vehicle V1 to the nth traveling vehicle Vn. Through this operation, an occupation request RQA and a release request RQB are transmitted to the blocking controller BC from each of the first traveling vehicle V1 to the nth traveling vehicle Vn.

Upon receiving the occupation request RQA and the release request RQB from each of the first traveling vehicle V1 to the nth traveling vehicle Vn, the blocking controller BC performs the processes of Step S5 to Step S7 and Step S14 to Step S17 of FIG. 5 all together in Step S23. Through this operation, the blocking controller BC performs processes such as determination for the occupation request RQA and the release request RQB transmitted from each of the first traveling vehicle V1 to the nth traveling vehicle Vn.

In Step S24, the blocking controller BC transmits to each of the first traveling vehicle V1 to the nth traveling vehicle Vn the determination result for the occupation request RQA and the release request RQB as response information T6. Step S24 is similar to Step S9 and Step S16 of FIG. 5. The first traveling vehicles V1 to the nth traveling vehicle Vn that have received the response information T6 are subjected to exclusive control on the basis of the received response information T6.

The traveling vehicle system SYS performs the exclusive control by cyclically repeating Step S21 to Step S24 where Step S21 to Step S24 are taken as one cycle T.

As described above, the traveling vehicle system SYS of this example is a traveling vehicle system including a plurality of traveling vehicles V and a blocking controller BC that is capable of communicating with the plurality of traveling vehicles V and that controls the plurality of traveling vehicles V, a traveling region of the traveling vehicles V having designated therein a plurality of blocking sections B each of which undergoes, when occupied by one of the plurality of traveling vehicles V, exclusive control to prohibit another traveling vehicle V from moving thereinto, and the traveling vehicle V being controlled to be able to occupy and pass through the blocking sections B when an occupation permission for the blocking sections B is granted by the blocking controller BC and to be prohibited to move into the blocking sections B when the occupation permission is not granted by the blocking controller BC. The blocking controller BC determines, where in a series of operations to be executed by the traveling vehicle V, the operation of the traveling vehicle V from the start of traveling to stopping before executing a predetermined operation included in the series of operations is demarcated, whether or not to grant the traveling vehicle V an occupation permission for the blocking sections B to be occupied for the traveling vehicle V to execute operations. According to the above configuration, it is possible to avoid hindrance to the operation of the traveling vehicles V associated with exclusive control to the utmost extent while suppressing interference between traveling vehicles V by exclusive control. When the traveling vehicle V requires a relatively long time to execute a predetermined operation, if the blocking sections B related to the operation of the traveling vehicle V after the completion of the predetermined operation is also occupied in advance, another traveling vehicle V is hindered from traveling therethrough more than necessary. According to the above configuration, compared to a configuration of performing exclusive control for all sections through which a traveling vehicle V is supposed to pass, it is possible to reduce the number of blocking sections B to be temporarily occupied, by performing exclusive control where in a series of operations to be executed by a traveling vehicle, the operation up to stopping before executing a predetermined operation is demarcated. That is to say, it is possible to avoid hindrance to the operation of another traveling vehicle V to the utmost extent while suppressing interference with other traveling vehicles V by exclusive control. In the traveling vehicle system SYS, configurations other than those described above are arbitrary configurations, and configurations other than those described above may or may not be necessary.

The traveling vehicle system SYS of this example includes a grid-patterned track R that has a plurality of first tracks R1 extending along a first direction DR1, and a plurality of second tracks R2 extending along a second direction DR2, which is different from the first direction DR1, and that forms a plurality of cells with the plurality of the first tracks R1 and the plurality of second tracks R2. Moreover, the plurality of traveling vehicles V travel on the first tracks R1 or the second tracks R2 along the grid-patterned track R, and the blocking section B is set for each grid cell C, which is one of the cells in the grid-patterned track R. In such a configuration, a traveling vehicle V in a stop state at any grid cell C hinders the traveling of another traveling vehicle V since all of the grid cells C of a grid-patterned track R are intersections. Therefore, in the grid-patterned track R, hindrance to the traveling of another traveling vehicle V is likely to reduce the traveling efficiency compared to a traveling vehicle system configuration having tracks other than the grid-patterned track R. However, according to the above configuration, it is possible to suppress the reduction in the traveling efficiency mentioned above.

Next, a traveling vehicle control method will be described, on the basis of the traveling vehicle system SYS of the example described above. In the following description of the traveling vehicle control method, configurations similar to those in the above traveling vehicle system SYS are given the same reference signs and the descriptions thereof are omitted or simplified where appropriate. Also, among the items described herein, applicable configurations are also applied to the traveling vehicle control method where appropriate. Furthermore, the traveling vehicle control method is not limited by the following description.

The traveling vehicle control method is a traveling vehicle control method in the traveling vehicle system SYS. The traveling vehicle control method includes: executing exclusive control by making the blocking controller BC determine, where in a series of operations to be executed by the traveling vehicle V, the operation of the traveling vehicle V from the start of traveling to stopping before executing a predetermined operation included in the series of operations is demarcated, whether or not to grant the traveling vehicle V an occupation permission for the blocking sections B to be occupied for the traveling vehicle V to execute operations.

In the traveling vehicle control method, execution of the above exclusive control is performed, for example, by performing Step S4 to Step S11 of FIG. 5.

According to the traveling vehicle control method, exclusive control may be performed where in a series of operations to be executed by the traveling vehicle V, the operation up to stopping before executing a predetermined operation is demarcated, and it is therefore, possible to avoid hindrance to the operation of another traveling vehicle associated with exclusive control to the utmost extent while suppressing interference between traveling vehicles by exclusive control. In the traveling vehicle control method, configurations other than those described above are arbitrary configurations, and configurations other than those described above may or may not be necessary.

The traveling vehicle system SYS and the control method realize prevention of interference between traveling vehicles V by exclusive control, and can, therefore, be implemented without, for example, providing a new mechanical mechanism and a physical sensor such as a sensor that detects another traveling vehicle V in the existing traveling vehicle system. Therefore, no failure will occur in mechanical mechanisms or physical sensors, and no adjustment or maintenance is required.

Second Example

Hereunder, a second example is described. In this example, members similar to those described above are assigned with the same reference signs and the descriptions thereof are omitted or simplified where appropriate. Also, among the items described in the examples herein, configurations applicable to this example are also applied to this example where appropriate.

Figure 21:
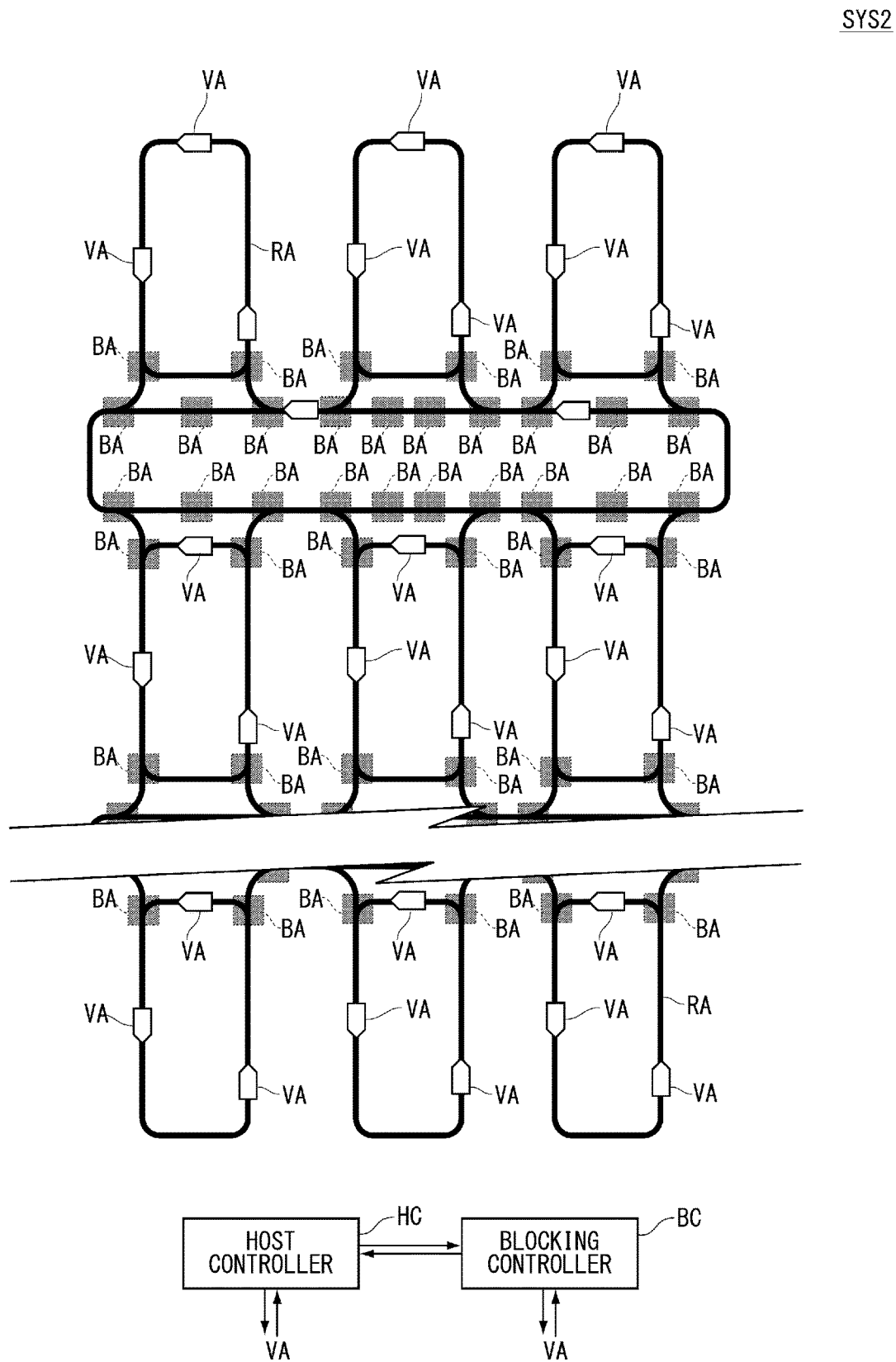
FIG. 21 is a diagram showing a traveling vehicle system according to a second example.

FIG. 21 is a diagram showing a traveling vehicle system SYS2 according to the second example.

In the traveling vehicle system SYS of the first example, the track R, the blocking sections B, and the traveling vehicles V may be of other configurations. For example, the traveling vehicle system SYS2 of this example differs from the traveling vehicle system SYS of the first example in the configurations of the grid-patterned track R, the blocking sections B, and the traveling vehicles V, and other configurations are similar to those of the traveling vehicle system SYS of the first example.

A track RA of the traveling vehicle system SYS2 is a track in which a plurality of track-shaped (oval-shaped) circulating tracks are connected. The track RA is installed in a state of being suspended from the ceiling of a building. The track RA has a plurality of branching parts and merging parts. A blocking section BA of the traveling vehicle system SYS2 is set at each intersection serving as a branching part or as a merging part of the track RA. The traveling vehicles VA of the traveling vehicle system SYS2, for example, travel along the track RA and travel almost directly below the track RA.

In the traveling vehicle system SYS2 of this example also, exclusive control is performed where in a series of operations to be executed by the traveling vehicle V, the operation up to stopping before executing a predetermined operation is demarcated, and it is therefore, possible to avoid hindrance to the operation of another traveling vehicle associated with exclusive control to the utmost extent while suppressing interference between traveling vehicles by exclusive control.

The technical scope of this disclosure is not limited to the mode described in the above examples. One or more of the requirements described in the above examples may be omitted in some instances. One or more of the requirements described in the above examples may be appropriately combined. The contents of all documents cited in the detailed description are incorporated herein by reference.

The configuration of the blocking controller BC described above is merely an example, and another configuration may be employed therefor. For example, the blocking controller BC may have some or all of the configurations of the host controller HC described above.

The examples described above illustrated a configuration in which the traveling vehicle V makes a request to the blocking controller BC for an occupation permission regarding the blocking sections B to be occupied for the traveling vehicle V to execute operations, where in a series of operations to be executed by the traveling vehicle V itself, the operation of the traveling vehicle V itself from the start of traveling to stopping before executing a predetermined operation included in the series of operations is demarcated. However, this disclosure is not limited to this configuration. For example, the traveling vehicle V may transmit an occupation request included in the series of operations to the blocking controller BC, and the blocking controller BC may grant an occupation permission regarding the blocking sections B to be occupied for the traveling vehicle V to execute operations, where the operation of the traveling vehicle V up to stopping before executing the above predetermined operation is demarcated. Furthermore, exclusive control may be executed by a configuration in which the host controller HC generates the occupation request RQA described above, which is generated by the traveling vehicle V, to make a request to the blocking controller BC, and transmits to the traveling vehicle V an occupation permission regarding the blocking sections B for which an occupation permission has been granted.

In the above description, an example is shown in which a region similar to that in FIG. 8 is set in each grid cell C. However, this disclosure is not limited to this example. For example, a different region may be set in each grid cell C, or the above region may not be set in the grid cell C in which transfer is not performed.

The determination rules described above are merely an example and other criteria may be used. For example, as a determination rule, the occupation request determiner 64 may determine to grant an occupation permission for the blocking sections B to a traveling vehicle V of a high priority among the plurality of traveling vehicles V, on the basis of the priorities of the plurality of traveling vehicles V, and may determine not to grant an occupation permission to a traveling vehicle V of a low priority, when requests for an occupation permission for the blocking sections B are received from the plurality of traveling vehicles V. In such a configuration, it is possible to prevent the traveling of the traveling vehicle V of a high priority from being hindered by the traveling vehicle V of a low priority. The priority mentioned above is configured so that the occupation request determiner 64 can make reference thereto. The priority mentioned above may be set in advance, or may be set by any of the host controller HC, the blocking controller BC, and the traveling vehicle V, on the basis of a predetermined criterion while the system is operating.

Also, as a determination rule, when requests for an occupation permission for a blocking section B is received from a plurality of the traveling vehicles V, the occupation request determiner 64 may determine to grant occupation permission for the blocking section B to the traveling vehicle V having a short route distance to the blocking section B, among the plurality of traveling vehicles V, and determine not to grant occupation permission to a traveling vehicle V having a long route distance to the blocking section B, in terms of the route distances between the target blocking section B of the occupation permission and the traveling vehicles V. In such a configuration, it is possible to prevent the traveling of the traveling vehicle V having a short route distance to the blocking section B from being hindered by the traveling vehicle V having a long route distance to the blocking section B.

The processing of Step S21 to S24 performed by the blocking controller BC is merely an example, and another method may be employed. For example, the blocking controller BC may process the request transmission of the first traveling vehicle V1 to the nth traveling vehicle Vn in Step S22 by the processing of Step S5 to S9 or Step S14 to S17 for every request transmission of the first traveling vehicle V1 to the nth traveling vehicle Vn, rather than processing it collectively by Step S23 and Step S24.

The processing of Step S3 to S9 or Step S14 to S17 performed by the blocking controller BC is merely an example, and another method may be employed. For example, the blocking controller BC may process the request transmission of the first traveling vehicle V1 to the nth traveling vehicle Vn by the processing of Step S5 to S9 or Step S14 to S17 for every request transmission of the first traveling vehicle V1 to the nth traveling vehicle Vn, rather than processing it through cyclic communication described in FIG. 20 and so forth.

The traveling vehicle system control method described above may be realized by a computer program. For example, the above program includes: causing a computer to execute exclusive control by determining, where in a series of operations to be executed by the traveling vehicle V, the operation of the traveling vehicle V from the start of traveling to stopping before executing a predetermined operation included in the series of operations is demarcated, whether or not to grant the traveling vehicle V an occupation permission for the blocking sections B to be occupied for the traveling vehicle V to execute operations. This program may also be recorded and provided on a computer-readable memory storage medium (for example, non-transitory tangible media), or may be provided by a control device that executes the program.

One or more of the requirements described in the above examples may be omitted in some instances. One or more of the requirements described in the above examples may be appropriately combined. The contents of Japanese Patent Application No. 2019-095829 and all documents cited in the detailed description are incorporated herein by reference.

The invention claimed is:

1. A traveling vehicle system comprising:
  a plurality of traveling vehicles, wherein each traveling vehicle comprises:
    a main body, a plurality of travelers, a plurality of couplers, and a vehicle controller, wherein:
    the main body is generally rectangular in shape, having four corners;
    each traveler is connected to a corner of the main body by a coupler, such that the main body is suspended below the traveler;
    wherein each coupler comprises a direction changer, wherein the direction changer is connected to the traveling wheel to cause the wheel to pivot from a first direction to a second direction in response to a communication from a controller;
    each traveler comprises a traveling wheel, at least one auxiliary wheel, and
  the controller being capable of communicating with the vehicle controller in each of the plurality of traveling vehicles and that controls the plurality of traveling vehicles;

a traveling region of the traveling vehicles having designated therein a plurality of blocking sections each of which undergoes, when occupied by one of the plurality of traveling vehicles, exclusive control to prohibit another traveling vehicle from moving thereinto; and the traveling vehicle being controlled to be 1) able to occupy and operate in the blocking sections when an occupation permission for the blocking sections is granted by the controller and 2) prohibited from operating in the blocking sections when the occupation permission is not granted by the controller, wherein the controller determines, where in a series of operations to be executed by the traveling vehicle, the operation of the traveling vehicle from the start of traveling to stopping before executing a predetermined operation included in the series of operations is demarcated, whether or not to grant the traveling vehicle an occupation permission for the blocking sections to be occupied for the traveling vehicle to execute operations.

2. The traveling vehicle system according to claim 1, wherein after executing the exclusive control regarding the blocking sections to be occupied for the traveling vehicle, in a series of operations to be executed by the traveling vehicle, to travel until stopping at a predetermined stop position immediately before performing a transfer operation to transfer an article to a transfer destination, the controller executes the exclusive control regarding the blocking section to be occupied for the transfer operation performed by the traveling vehicle.

3. The traveling vehicle system according to claim 2, wherein
the traveling vehicle transmits to the controller, as separate requests, a first occupation permission request regarding the blocking sections to be occupied therefor to travel until stopping at the predetermined stop position, and a second occupation permission request regarding the blocking section to be occupied for the transfer operation, and
the controller executes the exclusive control regarding the second occupation permission request after having executed the exclusive control regarding the first occupation permission request.

4. The traveling vehicle system according to claim 2, wherein the predetermined stop position is the blocking section that executes the transfer operation or the blocking section adjacent to the blocking section that executes the transfer operation.

5. The traveling vehicle system according to claim 4, wherein after executing the exclusive control regarding the blocking sections to be occupied for the traveling vehicle to, in a series of operations to be executed by the traveling vehicle, to travel until stopping at a position to perform a direction change, the controller executes the exclusive control regarding the blocking sections to be occupied for the traveling vehicle to travel after performing the direction change.

6. The traveling vehicle system according to claim 5, wherein
the traveling vehicle transmits to the controller, as separate requests, a third occupation permission request regarding the blocking sections to be occupied therefor to travel until stopping at a position to perform the direction change, and a fourth occupation permission request regarding the blocking sections to be occupied to travel after performing the direction change, and the controller executes the exclusive control regarding the fourth occupation permission request after having executed the exclusive control regarding the third occupation permission request.

7. The traveling vehicle system according to claim 1, wherein after executing the exclusive control regarding the blocking sections to be occupied for the traveling vehicle, in a series of operations to be executed by the traveling vehicle, to travel until stopping at a position to perform charging, the controller executes the exclusive control regarding the blocking sections to be occupied for the traveling vehicle to travel after performing the charging.

8. The traveling vehicle system according to claim 7, wherein
the traveling vehicle transmits to the controller, as separate requests, a fifth occupation permission request regarding the blocking sections to be occupied therefor to travel until stopping at a position to perform the charging, and a sixth occupation permission request regarding the blocking sections to be occupied to travel after performing the charging, and the controller executes the exclusive control regarding the sixth occupation permission request after having executed the exclusive control regarding the fifth occupation permission request.

9. The traveling vehicle system according to claim 1, further comprising a grid-patterned track having a plurality of first tracks extending along a first direction, and a plurality of second tracks extending along a second direction that is different from the first direction, and forms a plurality of cells with the plurality of first tracks and the plurality of second tracks, wherein
the plurality of traveling vehicles travel on the first tracks or the second tracks along the grid-patterned track, and
the blocking section is set for each grid cell, which is one of the cells in the grid-patterned track.

10. A method of controlling a traveling vehicle in a traveling vehicle system including a plurality of traveling vehicles and a controller capable of communicating with the plurality of traveling vehicles and that controls the plurality of traveling vehicles, wherein each traveling vehicle comprises:
a main body, a plurality of travelers, a plurality of couplers, and a vehicle controller, wherein:
the main body is generally rectangular in shape, having four corners;
each traveler is connected to a corner of the main body by a coupler, such that the main body is suspended below the traveler;
wherein each coupler comprises a direction changer, wherein the direction changer is connected to the traveling wheel to cause the wheel to pivot from a first direction to a second direction in response to a communication from a controller;
each traveler comprises a traveling wheel, at least one auxiliary wheel, and
a traveling region of the traveling vehicles having designated therein a plurality of blocking sections each of which undergoes, when occupied by one of the plurality of traveling vehicles, exclusive control to prohibit another traveling vehicle from moving thereinto, and
the traveling vehicle being controlled to be 1) able to occupy and operate in the blocking sections when an occupation permission for the blocking sections is granted by the controller and 2) prohibited from operating in the blocking sections when the occupation permission is not granted by the controller, the method comprising causing the controller to determine, where in a series of operations to be executed by the traveling vehicle, the operation of the traveling vehicle from the start of traveling to stopping before executing a predetermined operation included in the series of operations is demarcated, whether or not to grant the traveling vehicle an occupation permission for the blocking sections to be occupied for the traveling vehicle to execute operations.

* * * * *